US012571697B2

(12) United States Patent
Haynes et al.

(10) Patent No.: US 12,571,697 B2
(45) Date of Patent: Mar. 10, 2026

(54) SEALING DEVICE

(71) Applicant: Lake Products Limited, Auckland (NZ)

(72) Inventors: Andrew Leo Haynes, Auckland (NZ); Gabriel Ioan Giurgiu, Auckland (NZ)

(73) Assignee: Lake Products Limited, Auckland (NZ)

( * ) Notice: Subject to any disclaimer, the term of this patent is extended or adjusted under 35 U.S.C. 154(b) by 1186 days.

(21) Appl. No.: 17/044,881

(22) PCT Filed: Apr. 4, 2019

(86) PCT No.: PCT/IB2019/052740
§ 371 (c)(1),
(2) Date: Oct. 2, 2020

(87) PCT Pub. No.: WO2019/193521
PCT Pub. Date: Oct. 10, 2019

(65) Prior Publication Data
US 2021/0190612 A1 Jun. 24, 2021

(30) Foreign Application Priority Data

Apr. 4, 2018 (NZ) ........................................ 741273

(51) Int. Cl.
*G01L 7/02* (2006.01)
*F16L 55/115* (2006.01)
*G01L 19/10* (2006.01)

(52) U.S. Cl.
CPC ........... *G01L 7/026* (2013.01); *F16L 55/1157* (2013.01); *G01L 19/10* (2013.01)

(58) Field of Classification Search
CPC ......... G01L 7/026; G01L 19/10; G01L 7/086; F16L 55/1157; F16L 23/10; F16L 55/115;
(Continued)

(56) References Cited

U.S. PATENT DOCUMENTS 2,542,414 A 2/1951 Jansen
3,241,514 A 3/1966 Grimland
(Continued)

FOREIGN PATENT DOCUMENTS

DE 20215438 U 1/2003
WO WO-2019193521 A1 * 10/2019 .............. F16L 23/10

OTHER PUBLICATIONS

International Search Report and Written Opinion regarding Appl. No. PCT/IB2019/052740, dated Jul. 8, 2019, 12 pps.
(Continued)

*Primary Examiner* — Kristina M Deherrera
*Assistant Examiner* — Tania Courson
(74) *Attorney, Agent, or Firm* — Foley & Lardner LLP

(57) ABSTRACT

This invention relates to a fluid sealing device comprising a sealing member comprising a first surface and an opposite second surface. A first region of the first surface for forming a first seal about an aperture of a process component containing a fluid, and an inner region of the first surface to be exposed to the fluid via the process component aperture. A restraining member providing a support surface facing the second surface, a perimeter portion of the restraining member interfacing with a first region of the second surface, the first regions of the first and second surfaces corresponding with a first region of the sealing member. An inner region of the second surface spaced from the support surface to form a cavity between the inner region of the second surface and the supporting surface at least in an unpressurised condition. The inner regions of the first and second surfaces corresponding with an inner region of the sealing member, the inner region of the sealing member moveable towards and away from the support surface under action of a pressure of the fluid on the inner region of the first surface to provide an indication of the pressure.

29 Claims, 20 Drawing Sheets

(58) Field of Classification Search
CPC ....... F16L 2201/20; F16J 15/02; F16J 13/065;
F16J 13/24; F16J 15/48; F16K 3/16;
F17C 2250/043
See application file for complete search history.

(56) References Cited

U.S. PATENT DOCUMENTS

| | | | | |
|---|---|---|---|---|
| 3,492,968 | A | 2/1970 | Workman | |
| 3,703,879 | A | 11/1972 | Huthsing, Jr. | |
| 4,819,686 | A * | 4/1989 | Achterholt | B60C 23/0496 |
| | | | | 137/227 |
| 5,365,967 | A * | 11/1994 | Moore | B60C 23/0496 |
| | | | | 137/227 |
| 6,116,281 | A | 9/2000 | Mastromatteo | |
| 6,305,313 | B1 * | 10/2001 | Cunkelman | G01K 11/06 |
| | | | | 374/E11.006 |
| 6,911,903 | B2 * | 6/2005 | Gladstone | B60C 23/0496 |
| | | | | 340/447 |
| 7,493,808 | B2 * | 2/2009 | Milanovich | B60C 23/0496 |
| | | | | 73/146.8 |
| 9,109,711 | B2 * | 8/2015 | Mattson | F16K 37/00 |
| 9,126,462 | B2 * | 9/2015 | Hinque | B60C 23/123 |
| 2003/0001733 | A1 * | 1/2003 | Huang | B60C 23/04 |
| | | | | 73/146.8 |
| 2005/0028721 | A1 | 2/2005 | Gladstone et al. | |
| 2005/0072349 | A1 | 4/2005 | Perlin et al. | |
| 2005/0092079 | A1 | 5/2005 | Ales et al. | |
| 2008/0136117 | A1 * | 6/2008 | Roe | F16J 13/065 |
| | | | | 277/530 |
| 2014/0084549 | A1 * | 3/2014 | Haynes | F16L 5/10 |
| | | | | 277/606 |
| 2018/0010724 | A1 | 1/2018 | Kozak | |

OTHER PUBLICATIONS

International Preliminary Report on Patentability on PCT/IB2019/052740, mail date Oct. 6, 2020, pp. 1-10.

* cited by examiner

SEALING DEVICE

CROSS-REFERENCE TO RELATED APPLICATIONS

The present application claims the benefit of, and priority to, International Patent Application No. PCT/IB2019/052740, filed Apr. 4, 2019, which claims the benefit of, and priority to New Zealand Patent No. 741273, filed Apr. 4, 2018, the contents of which are both incorporated herein by reference in their entitles.

FIELD OF THE INVENTION

The present invention relates to a sealing device, more particularly, though not solely, to a sealing device with an indicator as to the presence of a pressurised fluid that may be exposed to the sealing side of the device.

BACKGROUND TO THE INVENTION

A number of systems are available for sealing a terminus of a conduit or an aperture of a piece of equipment through which a fluid may travel or be stored.

There are also a variety of instruments available for sealing a terminal end of a conduit or an aperture and provide an indication of the pressure of the fluid being retained. For example, ABB's tri-clamp sanitary gauge 4-20 mA pressure transmitter (model 261GG), and Ashford Instrumentation's tri clamp hygienic 4-20 mA seal pressure transmitter (model SML).

Problems exist with a variety of fluid seals, in their ability to provide for a system suitable for use in sanitary or hygienic operating conditions. Yet further problems exist with sealing systems in general as to their capability to withstand a fluid held under an elevated pressure, yet provide an observer with an indication of the presence of such a fluid on the seal-side of the sealing system. Furthermore, pressure indication instruments can be expensive.

Problems also exist with the safety of sealing systems—for example, where a fluid is held or retained under an elevated pressure, and where for a variety of reasons either a sealing system failure for providing an indication of a fluid under pressure, or there is a user failure to observe that the sealing system is under pressure from a fluid.

Failure of the sealing surface or by a user to observe that the sealing surface is under pressure may result in injury or death or the potential for a dangerous situation to be set up for a user attending to the sealing system. For example, a user may inadvertently unlock a sealing system from the terminus of a conduit or an aperture of a piece of equipment on the belief that the sealing system is not experiencing pressure from a fluid which it is retaining. The user would then be potentially exposed to the fluid at an elevated pressure, including the potential for components of the sealing system to destructively fall. For example, if the seal or a pressure indicator of a sealing system falls, then a user would not be able to be provided with accurate information as to a fluid being retained under pressure.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF THE INVENTION

It may therefore be of particular interest to provide an alternative fluid sealing system, such a sealing system having the capability for providing a seal in a manner such that a fluid is prevented from flowing out of a conduit or an aperture, yet which provides an indication of the presence or pressure (or both) of the fluid with which the seal is retaining.

It may also of interest to provide an alternative fluid sealing system that has particular application for suitability for use in sanitary or other necessary hygienic applications or industries—for example a sealing system which is compliant with the requirements of food-grade or pharmaceutical grade type industries or operations.

It may be of still further interest to provide an alternative fluid sealing system that is capable of being a replacement for existing sealing systems and for use with existing coupling devices, such as proprietary couplings as cam-loc fittings, and other hinged or quick-release type couplings, such as for example those known under the brand of Tri-Clover™ clamps.

It is therefore an object of the present invention to provide an alternative sealing device or sealing system which will go at least some way towards addressing the foregoing problems or capabilities which will at least provide the industry and/or public with a useful choice.

In one aspect, the present invention broadly consists in a fluid sealing device comprising:
- a. a sealing member comprising a first surface and an opposite second surface,
- b. a first region of the first surface for forming a first seal about an aperture of a process component containing a fluid, and an inner region of the first surface to be exposed to the fluid via the process component aperture,
- c. a restraining member providing a support surface facing the second surface, a perimeter portion of the restraining member interfacing with a first region of the second surface, the first regions of the first and second surfaces corresponding with a first region of the sealing member,
- d. an inner region of the second surface spaced from the support surface to form a cavity between the inner region of the second surface and the supporting surface at least in an unpressurised condition,
- e. the inner regions of the first and second surfaces corresponding with an inner region of the sealing member, the inner region of the sealing member moveable towards and away from the support surface under action of a pressure of the fluid on the inner region of the first surface to provide an indication of the pressure.

In some embodiments, the first region of the second surface of the sealing member forms a second seal with the perimeter portion of the restraining member.

In some embodiments, the restraining member comprises at least one aperture through the support surface through which the sealing member can extend or is visible.

In some embodiments, an outer perimeter of the restraining member provides a flange to be clamped by a clamp in use to the process component comprising a corresponding flange about the process aperture, the clamp clamping the flange of the sealing device and the flange of the process component together.

In some embodiments, a housing enclosing the inner region of the sealing member and the restraining member, the housing being clear or at least partly transparent.

In some embodiments, the sealing member forms a seal with an outer facing side or ambient-condition surface of the restraining member or a housing enclosing the inner region of the second surface and the restraining member.

In some embodiments, a third region of the second surface facing the first region of the second surface forms the seal with an outer facing or ambient-condition surface of the housing or restraining member.

In some embodiments, a perimeter portion of the restraining member or the housing, or both, is or are positioned between the first region and the third region of the second surface, the sealing member providing an annular slot for receiving the restraining member or housing or both between the first and third regions of the second surface.

In some embodiments, the housing abuts with at least a surface of the restraining member.

In some embodiments, the outer perimeter of the restraining member extends radially outside the outer perimeter of the housing.

In some embodiments, the housing comprises a foot at an outer perimeter thereof, the foot including a base upon which the restraining member is to be abutted and a shoulder having an outer surface upon which the third region of the second surface is to be sealed thereto.

In some embodiments, the foot is sandwiched between the third region of the second surface and a perimeter portion of the restraining member.

In some embodiments, an outer perimeter of the restraining member covered by the sealing member provides a flange to be clamped by a clamp in use to the process component comprising a corresponding flange about the process aperture, the clamp clamping the flange of the sealing device and the flange of the process component together.

In some embodiments, the restraining member or the restraining member and a housing enables optical or visual detection of an extent to which the sealing member is moved by the pressure.

In some embodiments, the housing extends outwardly away from the restraining member to define an enclosure.

In some embodiments, the enclosure has a volume that is greater than a volume of the cavity in the unpressurised condition.

In some embodiments, when the device is in the non-pressurised condition, the volume of the enclosure is at least twice the volume of the cavity.

In some embodiments, the housing is a safety shield.

In some embodiments, the housing provides for containment of the fluid in an event whereby the sealing member fails.

In some embodiments, the housing is capable of withstanding a maximum pressure rating of the process equipment.

In some embodiments, the restraining member comprises at least one aperture through the support surface and the sealing member comprises a projection aligned with the aperture in the support surface to extend through the aperture to provide an indication of the fluid pressure.

In some embodiments, the extent to which the projection or projections extend into and/or through corresponding apertures in the support surface is indicative of the fluid pressure.

In some embodiments, a projection extending through an aperture of the restraining member provides for a visual indicator of the presence of a fluid at an elevated pressure condition.

In some embodiments, the projection or projections is/are a raised surface profile(s) extending from the second surface.

In some embodiments, the projection(s) extend from the second surface of a height so as to project through a corresponding at least one aperture when in a pressurised condition.

In some embodiments, there is a single projection.

In some embodiments, the projection is centrally located on the second surface.

In some embodiments, the sealing member has a base located upon the second surface and the projection extends from the base.

In some embodiments, the sealing member has a stop at a base of the projection, the stop providing a surface to contact the support surface when the sealing device is in a pressurised condition.

In some embodiments, the stop is dimensioned so as to be unable to extend into or through the restraining member aperture.

In some embodiments, the support surface may be profiled so as to receive or accommodate the stop.

In some embodiments, the projection or a side or sides of the projection is of a visually contrasting colour compared to the restraining member.

In some embodiments, the sealing member has an annular rib located at a base of the projection, in a pressurised condition the rib adapted to locate into the aperture to seal an annular space between the aperture and the projection.

In some embodiments, the sealing member has a lip at a distal (outer) end of the projection to limit the movement of the second surface away from the restraining member and/or to provide a seal against the restraining member when in an unpressurised condition.

In some embodiments, the restraining member has an annular shoulder about the aperture recessed from an external surface of the restraining member, and in the unpressurised condition the lip forming a seal with the annular shoulder.

In some embodiments, the inner region of the sealing member comprises a curved annular portion between a central portion and a perimeter portion, so that the second surface of the sealing member is convex between the central portion and the perimeter portion.

In some embodiments, an annular gap or space is provided between the projection and the aperture with the projection extending through the aperture.

In some embodiments, the sealing member is or comprises an elastomeric material or member.

In some embodiments, the sealing member is a unitary member.

In some embodiments, the device has a housing extending outwardly from the restraining member to define an enclosure to receive the indicator projection 14 of the sealing member at least when the sealing member is in the pressurised condition.

In some embodiments, the housing is fitted to the aperture of the restraint.

In some embodiments, a biasing member biases the second surface away from the support surface.

In some embodiments, the biasing member is interposed between the second surface and the support surface.

In some embodiments, a first end of the biasing member is configured to be seated or is seatable upon the second surface or a base of the sealing member.

In some embodiments, a second end of the biasing member is configured to be seated or is seatable upon the support surface of the restraining member or a region adjacent to an aperture through the support surface.

In some embodiments, the biasing member substantially surrounds at least one projection extending from the second surface.

In some embodiments, the biasing member extends from a base of the sealing member extending from the second surface to a location adjacent to or about a support surface aperture corresponding with the projection.

In some embodiments, the biasing member is one or more of: a helical spring, a leaf spring, an elastically compressible material or block of material and a compressible fluid or gas.

In some embodiments, the biasing member is replaceable or retro-fittable with an additional or a different biasing member of the same or a different spring constant.

In some embodiments, the support surface is of a profile such that when the first surface is not exposed to a fluid or is in a non-pressurised condition, a cavity volume is defined between at least the inner region of the second surface and the support surface, and when the first surface is exposed to a fluid or is in a pressurised condition, the cavity volume is reduced.

In some embodiments, the cavity volume varies according to the relative position of the second surface to the support surface.

In some embodiments, the restraining member has a surface profile to accommodate the second surface of the sealing member.

In some embodiments, the support surface has a profile to accommodate at least the inner region of the second surface of the sealing member.

In some embodiments, the sealing member is elastically deformable.

In some embodiments, the inner region of the sealing member is moveable by elastic deformation upon influence of the fluid upon the inner region of the first surface.

In some embodiments, the inner region of the sealing member is substantially resiliently flexible.

In some embodiments, the sealing device comprising at least the sealing member and the restraining member, and optionally a or the housing, is of materials selected for one or more of: sanitary or hygienic applications, food-grade applications, pharmaceutical-grade applications, corrosive chemical applications, industrial applications, chemical resistance including acids and/or bases, temperature resistance.

In some embodiments, the sealing member is formed of one or more of EPDM, Viton, Neoprene, Nitrile, Natural rubber and silicone.

In some embodiments, the restraining member is formed of one or more of a plastic material, copper, brass, mild steel, and stainless steel.

In some embodiments, the housing is formed of a rigid material such as polycarbonate.

In some embodiments, the inner region of the sealing member comprises a resilient section extending between the first region and the projection, and the projection comprises a relatively rigid material.

In some embodiments, a material of the resilient section covers a base of the projection to form a continuous surface forming the first surface of the sealing member.

In some embodiments, the resilient section comprises an elastomeric material.

In some embodiments, the device comprises a seal between the projection received in the aperture and the restraining member.

In some embodiments, the device comprises a housing enclosing the inner region of the sealing member and the restraining member, in a pressure condition the projection contacting the housing to deform the housing to provide an indication of the pressure.

In some embodiments, the housing comprises a reduced thickness portion, in the pressurised condition the projection contacting the reduced thickness portion.

In some embodiments, the device comprises an actuator stem and an indicator stem, the actuator stem housed in a longitudinal recess in the restraining member, and the indicator stem housed in a lateral recess in the restraining member, f. In a pressurised condition the sealing member moving towards the restraining member and moving the actuator stem, the actuator stem interacting with the indicator stem to cause the indicator stem to extend out of the lateral recess of the restraining member to provide an indication of the pressure.

In some embodiments, the actuator stem is biased towards the second surface of the sealing member.

In some embodiments, the actuator and indicator stems each comprise a permanent magnet, the polarities of the actuator stem and indicator stem magnets arranged so that the indicator stem is attracted to the actuator stem when the sealing member is in an un-pressurised condition, and in a pressurised condition the actuator stem repeals the indicator stem to cause the indicator stem to extend out of the restraining member to provide an indication of the pressure In some embodiments, the actuator and indicator stems comprise complementary cam surfaces, mechanical contact between the actuating stem and the indicator stem driving the indicator stem to an extended position to provide an indication of the pressure.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

In FIG. 1 the sealing device is illustrated spaced from the process component, and a clamp is shown for clamping the sealing device to the component when in use.

FIG. 11A shows the device in an unpressurised condition, and FIG. 11B shows the device in a pressurised condition. A clamp for holding the sealing device in position on the process component is omitted for clarity.

FIG. 12A is a cross sectional perspective view of the sealing device, FIG. 12B shows the device placed over a process aperture of a process pipe and with a tri clover clamp being applied to clamp the device to the pipe, FIG. 12C shows a cross sectional perspective view of the sealing device placed over the aperture, and FIG. 12D is a perspective exploded view of the sealing device.

DETAILED DESCRIPTION OF PREFERRED EMBODIMENTS

Figure 1:
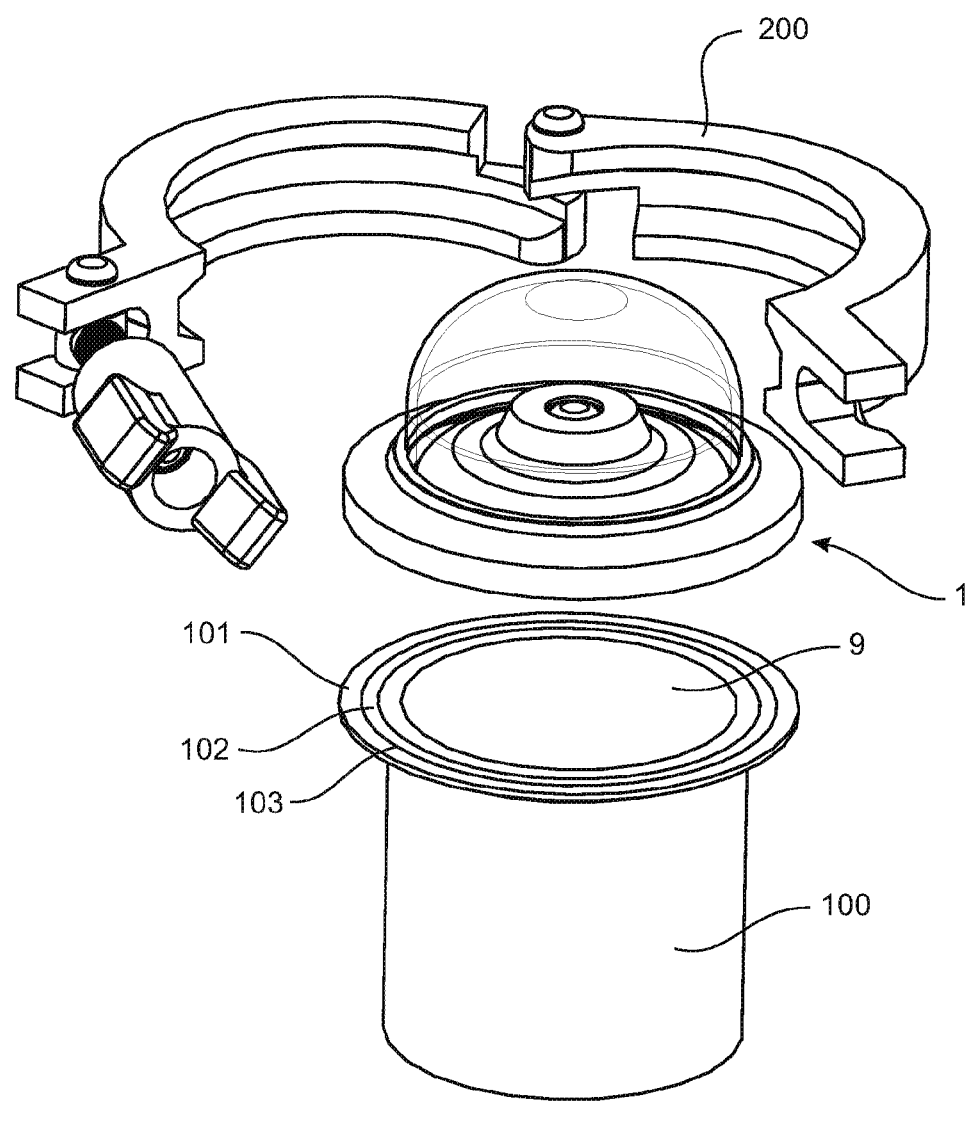
FIG. 1 illustrates a sealing device for sealing an aperture of a process component such as a pipe.
Figure 2:
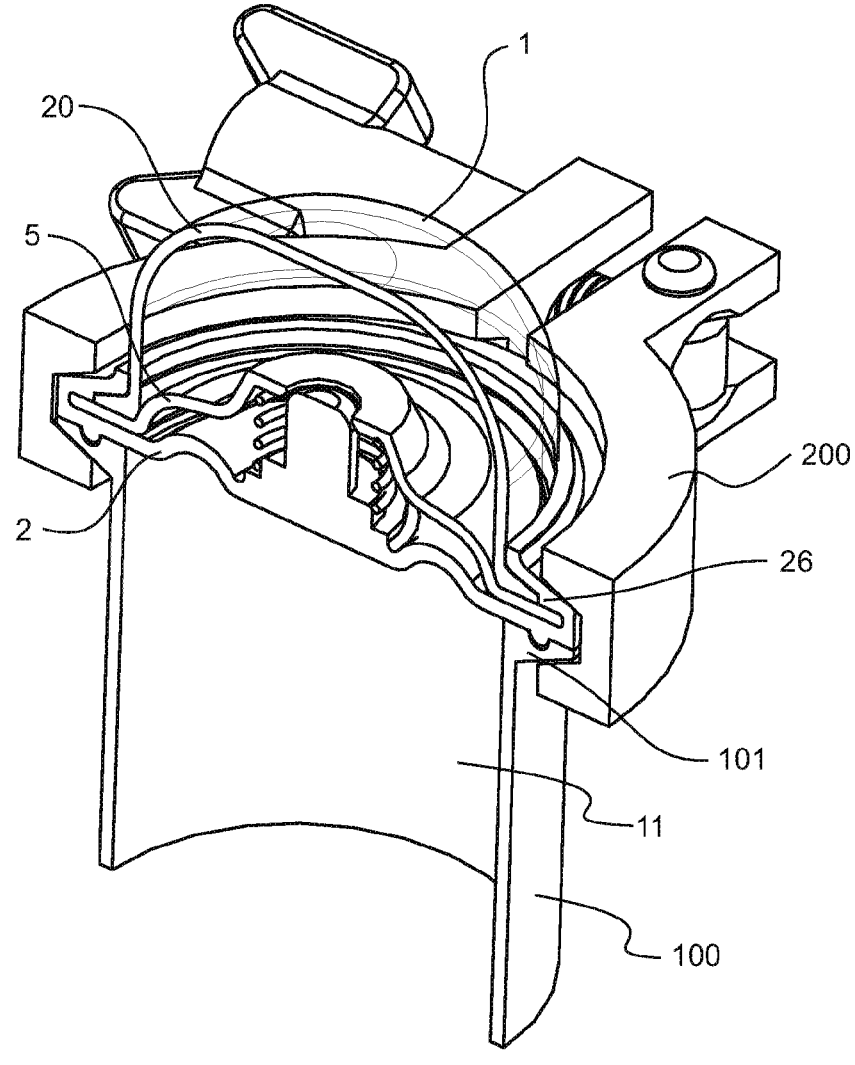
FIG. 2 is a cross sectional perspective view of the sealing device, process component and clamp of FIG. 1 assembled together.

Various embodiments are described with reference to the Figures. Throughout the Figures and specification, the same reference numerals may be used to designate the same or similar components, and redundant descriptions thereof may be omitted.

This invention provides for a sealing device to be securely connected to seal to the terminus aperture of a conduit (or pipe or hosing etc) or an aperture of a piece of equipment, all of which may be referred to as an aperture of a process equipment. The sealing device is provided for sealingly retaining a fluid within in the process equipment.

Particularly advantageous, is the ability to provide for a sealing surface which may be exposed to the fluid and yet which may be cleaned with relative ease. For example, the sealing surface for exposure to the fluid can be formed as a relatively smooth or uninterrupted surface, further assisting with the relative ease with which the surface may be cleaned or sanitised or made hygienic. Such a smooth surface helps to eliminate the potential for accumulation of biofilm or other detritus which may need to be cleaned off, for example during clean-in-place (CIP) operations.

Also, particularly advantageous is the provision of a sealing device which provides for an indication that a fluid is exposed to the sealing side of a sealing device, yet where the sealing side avoids use for a chamber or other repository for diverting at least a portion of the fluid so as to provide such an indication. For example, avoided is the use of any chamber or other channel for fluid to enter or be drawn off so as to be sensed by an indicator. Avoidance of such chamber or channels or such like helps to further eliminate unnecessary surfaces or regions of a sealing device which may become subject to bio-film growth or which would need to be cleaned to ensure sanitary or hygienic conditions are maintained by the sealing surface of the device.

Still further, it may be particularly advantageous for an indicator of the presence of a fluid upon the sealing surface to which the fluid is exposed. Such an indicator may provide for at least a visual indication of the presence of a fluid exposed to the sealing surface (e.g. a binary indication being either pressure or no pressure), and where the indicator may also provide for a variation in its visual indication as to the extent of the pressure of the fluid being retained by the sealing device.

In some embodiments, a feature may be provided for a fail-safe mode in the event the indicator fails for some reason, such as if the sealing surface is compromised by the fluid. For example, a housing may be provided to extend as an enclosure about the exterior side of the sealing device. The housing enclosure may provide for a fluid-tight seal for containing a fluid which may enter the enclosure from the aperture otherwise sealed. In this manner, a user of the sealing device can be provided with a further visual indicator for observance of fluid in the housing, even if the indicator itself falls for any reason.

Even more advantageously, the housing can be formed of a structurally resistant material, for example a polycarbonate, which is capable of withstanding high pressure or impacts. In this way, the housing provides for a safety shield about or as part of the sealing device. Such a housing provides for additional protection of a user in the event the sealing device falls in any way, the housing providing for a protective shield or enclosure for fluid or other components, for example of a sealing system, which may otherwise be ejected at high pressure when a sealing system is subject to an elevated pressure of a fluid. The housing or at least a part thereof can be visually transparent. This can allow a user to visually inspect the enclosure—visual inspection allowing for viewing of an indicator, such as projections, as well as to allow for the user to inspect if fluid may be in the enclosure of the housing.

With reference to FIGS. 1 to 4, in one embodiment there is provided a fluid sealing device 1 comprising a sealing member 2 including a first surface 3 and a second surface 4, and a supporting member or cap or restraint or restraining member 5 which comprises a support surface 6 by which the sealing member 2 may become impinged thereon. In some embodiments the restraint 5 includes at least one aperture 7 through the restraint 5. A seal is to be formed between a first region 8 of the first surface 3 and about a process component aperture 9 (such as an aperture or outlet from a conduit 100). An inner or second region 10 of the first surface 3 (inward of the first region 8) is exposed via the process component aperture 9 to a fluid to be contained within the process component (such as a conduit 100, a vessel, tank or other fluid storage or containing equipment).

In some embodiments, a further seal or second seal is to be formed between a first region (e.g. a perimeter portion) 12 of the second surface 4 and a perimeter portion of the restraint 5. The first regions of the first and second surfaces correspond with a first region of the sealing member.

An inner or second region 13 of the second surface (inward of the first region of the second surface) faces the support surface 6. The inner regions of the first and second surfaces correspond with an inner region of the sealing member 2 that is moveable under the influence of the fluid 11 acting on the inner region of the first surface. The sealing member is an elastic member (a member that deforms or deflects elastically under action of a fluid pressure). Preferably the sealing member is or comprises an elastomeric material or member. The sealing member 2 is or comprises a diaphragm or membrane that is adapted to seal over or 'blank off' the process aperture 9. The sealing member is adapted or configured to extend fully over the process aperture 9. Preferably the sealing member provides a continuous unbroken surface to fully cover the aperture 9. A perimeter portion 8 of the diaphragm is adapted to seal against a process component (e.g. pipe or tube) about the aperture 9, e.g. to a flange of the process component. The diaphragm provides a movable barrier between a fluid within the process component and the ambient environment outside of the process component. The support member or cap covers the diaphragm 2 and provides the aperture 7 through which the diaphragm is visible.

In some embodiments, as described below, the sealing member comprises a projection to extend through the aperture when the diaphragm is moved to a pressurised condition.

Movement of the second region of the sealing member is visible through the aperture 7 of the restraint 5 to provide an indication of the presence of pressurised fluid sealed by the sealing member 2. Alternatively, or additionally, the restrain may be formed from or comprise a transparent material to allow movement of the sealing member to be visible from outside of the device 1. Under influence of a fluid pressure, the inner region of the sealing member is moveable towards or away from the restraint 5. Movement of the inner region of the sealing member to or away from the restraint is determined by the pressure of the fluid acting on the inner region of the sealing member. In a pressurised condition, the inner region of the sealing member may contact or impinge on the support surface 6 of the restraint. In an unpressurised condition, the inner region of the sealing member is spaced from the support surface 6. The sealing member elastically deforms between the unpressurised and pressurised conditions.

Figure 3A:
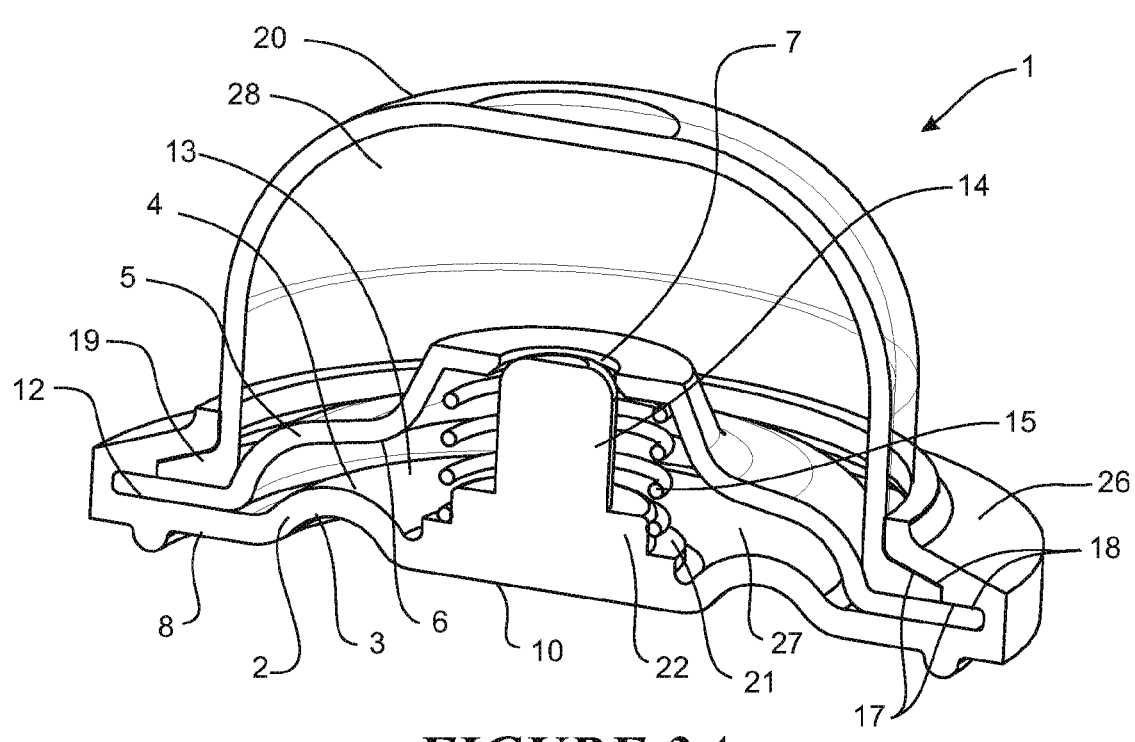
FIG. 3A is a cross sectional perspective view of the sealing device of FIG. 1 with the sealing device illustrated in an unpressurised condition.

In some embodiments, the inner region of the sealing member comprises one or more projections 14 extending from the second surface 4. The projection 14 is aligned with the aperture 7 in the restraint 5. Where the pressure of the fluid is zero-gauge pressure or below a pressure threshold, the inner region or sensing region of the sealing member is spaced from the restraint 5, as illustrated in FIG. 3A, providing a cavity 27 between the restraining member and the second surface of the sealing member, such that the projection does not extend through the aperture and beyond an external side of the restraint.

Figure 3B:
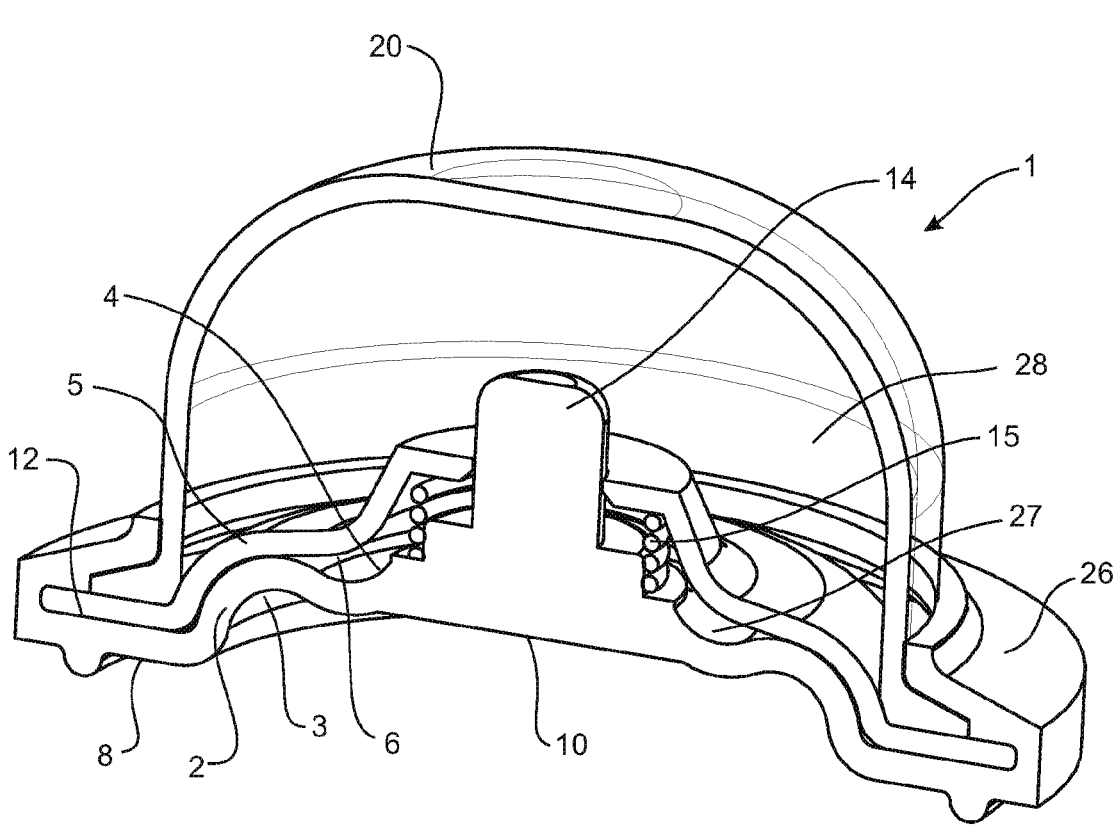
FIG. 3B is a cross sectional perspective view of the sealing device of FIG. 1 with the sealing device illustrated in a pressurised condition.
Figure 4:
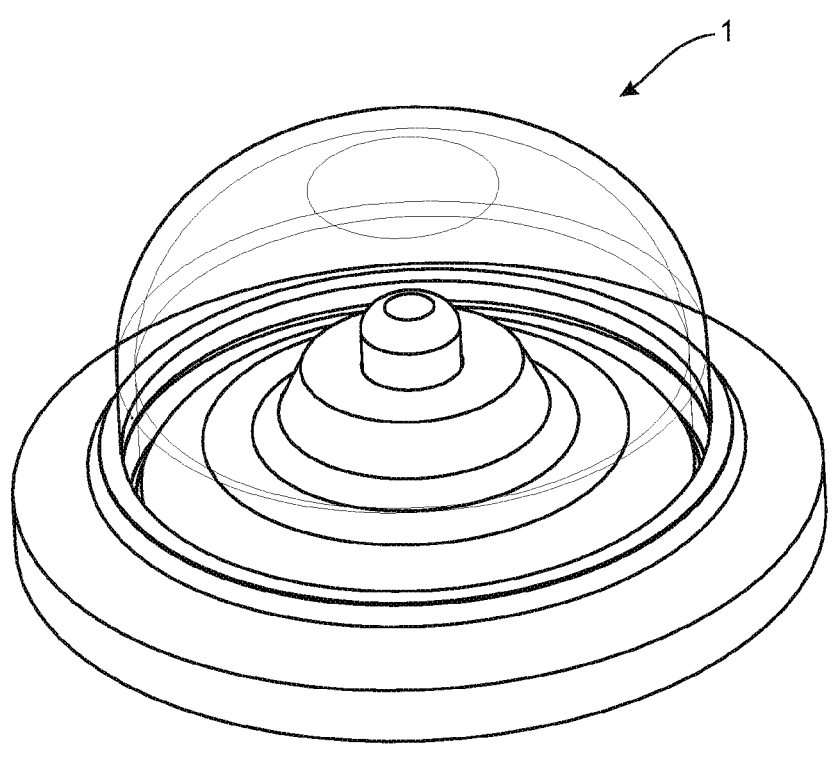
FIG. 4 is a perspective view of the sealing device of FIG. 1 with the sealing device illustrated in a pressurised condition.

When the gauge pressure of the fluid is greater than zero or above a threshold, the inner region of the sealing member moves towards the restraint 5, as illustrated in FIG. 3B. As the sealing member moves towards the restraint 5, the projection 14 extends through the aperture 7 in the restraint to be visible externally of the restraint 5 from a side of the device. The projection 14 may be described as an indicator. The higher the pressure of the fluid, the further the projection extends or projects through the aperture of the restraint, providing an indication of the working pressure of the fluid. Where the projection extends through the aperture 7 or beyond the restraint 5, a person sighting the projection is informed that the fluid 11 contained in the process equipment and sealed by the sealing member is pressurised. The restraining member limits the amount of movement of the sealing member in a pressurised condition by contact between the inner region of the second surface and the support surface of the restraint 5. Preferably the restraining member is opaque so that the sealing member cannot be viewed except via the restraining member aperture.

The extent to which the projection or projections extend into and/or through corresponding apertures in the support surface may be indicative of a fluid at an elevated pressure condition (i.e. elevated above ambient or ambient operational pressure conditions), or a fluid at a reduced pressure condition (i.e. reduced below ambient or ambient operational pressure conditions), or a fluid at ambient condition. The indicator may provide a binary indication of pressure acting on the sealing member, e.g. pressure or no pressure. Where there is no pressure (zero-gauge pressure) the indicator does not extend from the restraining member. Where there is a pressure above zero-gauge pressure the sealing member moves so that the indicator projection 14 extends from the restraining member to be visible.

The projection 14 or projections may be described as a raised surface profile extending from the second surface. The projection(s) extend from the second surface to a height so as to project through the corresponding at least one aperture when in a pressurised condition. As illustrated, in a preferred embodiment there is a single projection. The single projection is preferably centrally located on the second surface.

In some embodiments the sealing member 2 comprises a base 21 located upon the second surface 4.

In some embodiments, the base provides a support for a biasing means 15.

In some embodiments, the sealing member 2 has a stop 22 at a base of the projection. The stop 22 provides a surface to contact the support surface 6 when the sealing device senses a pressurised condition. The stop is dimensioned so as to be unable to extend into or through the restraint aperture 7. The thickness of the sealing member through the stop is greater than the thickness of the remainder of the inner region of the sealing member so that in a deformed or pressurised condition, the stop cannot be deformed through the aperture 7. The stop may seal against the restraint about the aperture 7 of the restraint when the sealing member is moved to the pressurised condition.

Figure 12A:
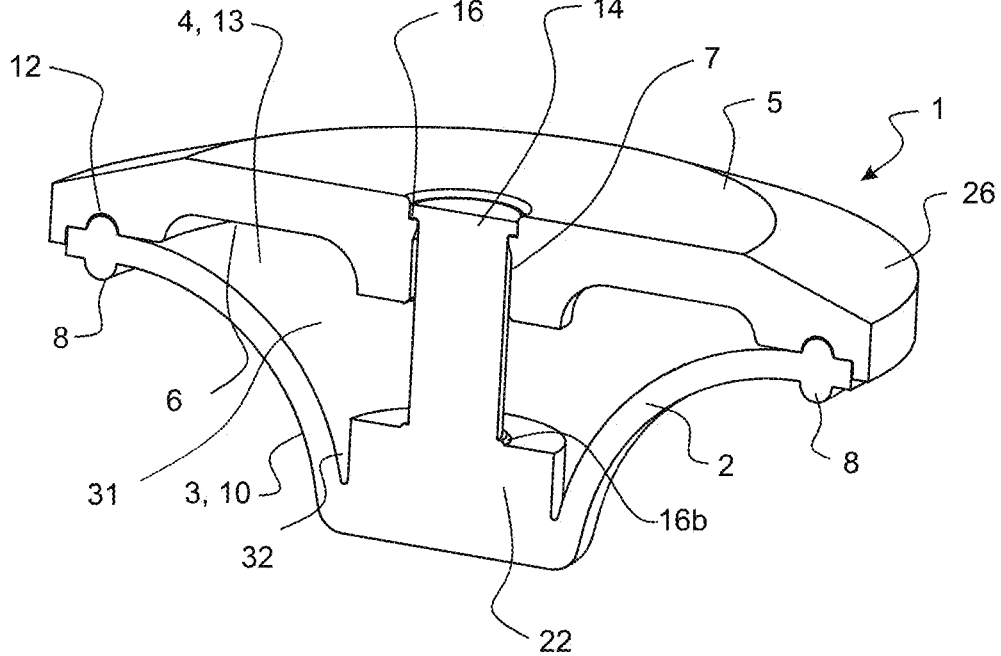
FIGS. 12A to 12D show another sealing device according to the present invention.
Figure 12B:
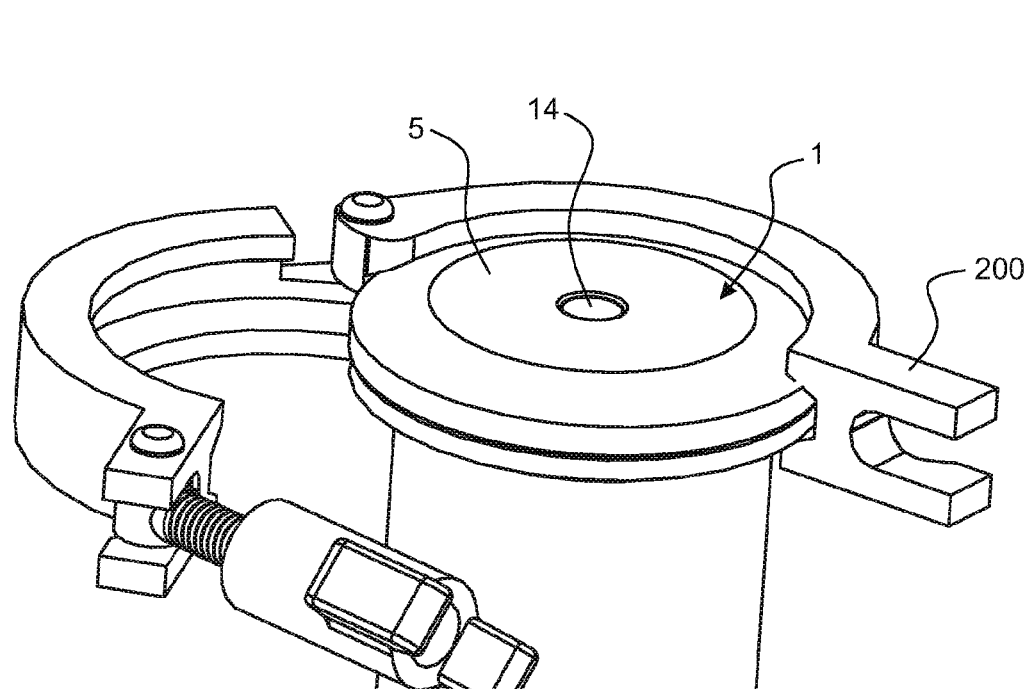
Figure 12C:
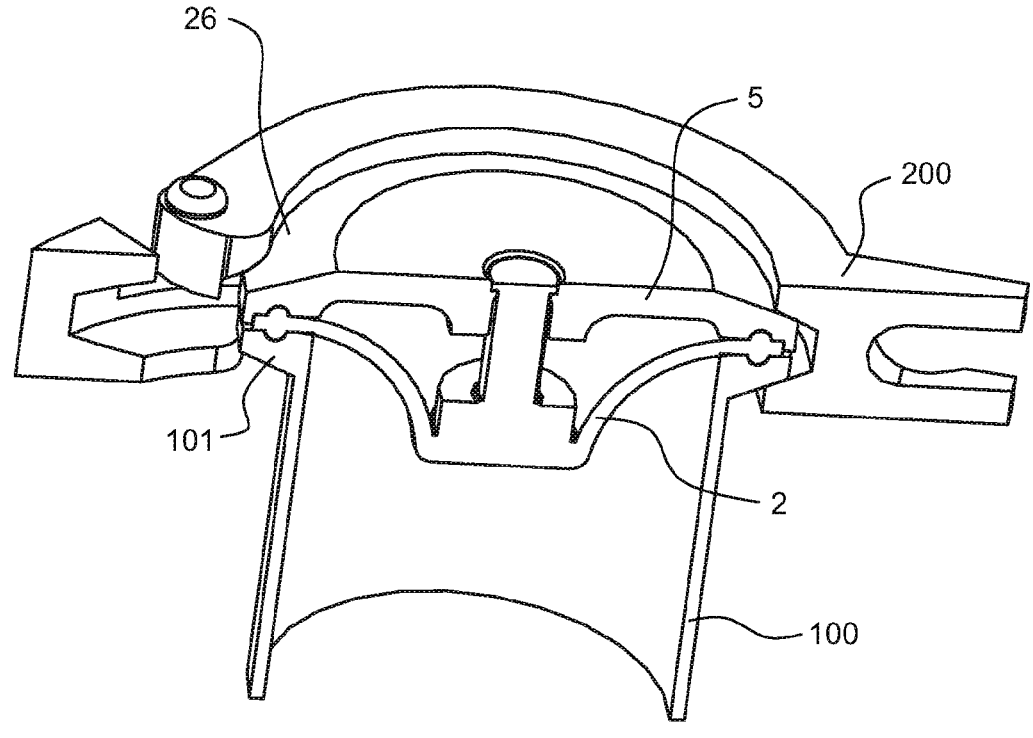
Figure 12D:
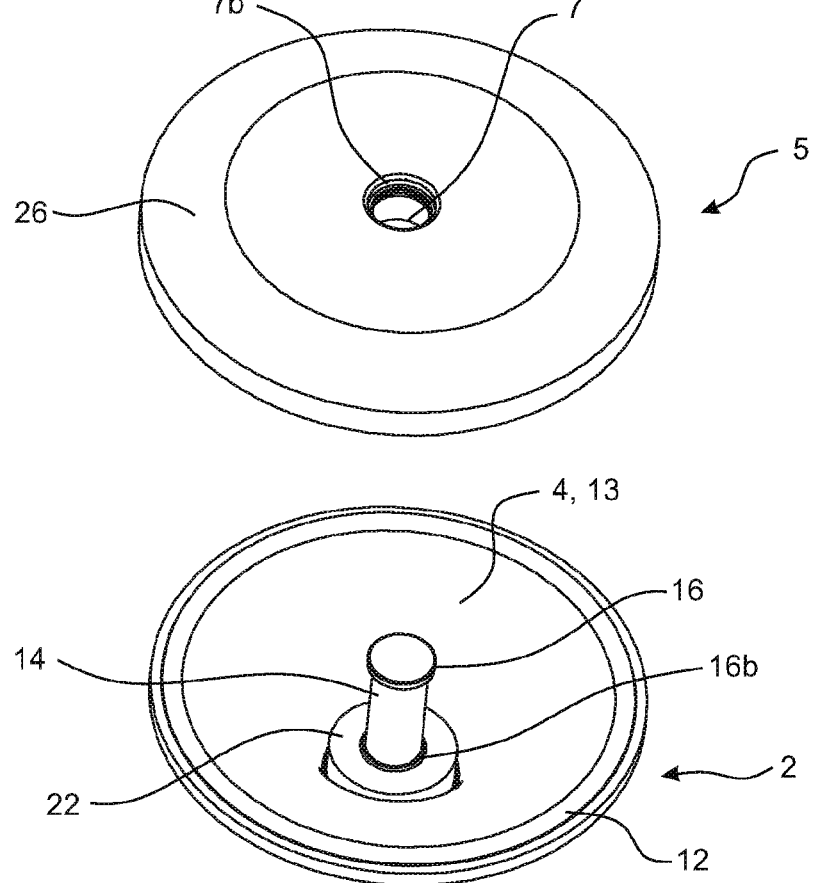

In some embodiments, as shown in FIGS. 12A and 12D, the sealing member may comprise an annular rib 16*b* located at a base of the projection. In the pressurised condition the rib 16*b* may press into the aperture to seal an annular space between the aperture and the projection.

In some embodiments, for example as shown in FIGS. 12A to 12D, the inner region 13 of the sealing member comprises a curved annular portion 31 between a central portion 32 and a perimeter portion 8, so that the second surface 4 of the sealing member 2 is convex between the central portion 32 and the perimeter portion 8. With the convex curved annular portion 31, as the sealing member 2 is deformed from the unpressurised condition to the pressurised condition the sealing member progressively makes contact with the restraint 5 from the perimeter portion of the sealing member towards the central portion. This arrangement may provide for stability for the movement of the projection 14 through the aperture of the restraint, as the contact between the sealing member and the restraint moving radially inwards may help to maintain the projection centrally relative to the aperture.

In some embodiments, the projection or projections may change colour or be colour indicative in response to a fluid exposed to the first surface, the colour change or indicative colour response being dependent on one or more of: temperature, pressure.

In some embodiments, a biasing means or member is provided to bias the inner region of the sealing member 2 away from the restraint 5. For example, as illustrated in FIGS. 1 to 4, a spring 15 is provided between the sealing member and the restraint. The biasing means sets a threshold pressure for the device so that the device provides an indication once that threshold has been reached or exceeded.

In some embodiments, an internal gas pressure may be provided to bias the sealing member away from the restraint 5. For example, the projection 14 may form a seal against the aperture 7 to contain a gas pressure in a cavity formed between the sealing member 2 and the restraint 5. Alternatively, where a housing 20 is provided, the housing may contain a gas pressure to bias the sealing member away from the restraint 5.

A first end of the biasing member may be seated on the second surface or the base 21, and a second end of the biasing member may be seated on the support surface 6 of the restraint member or a region adjacent to an aperture 7 through the support surface. As shown, the spring substantially surrounds at least one projection 14 extending from the second surface. Preferably, the biasing member is replaceable or retro-fittable with an additional or a different biasing member of the same or a different spring constant.

In some embodiments, an annular gap or space is provided between the projection and the sides of the aperture through the restraint, e.g. the aperture is larger than a cross section of the projection. The annular space allows for air/gas movement between the space 27 between the restraint and the sealing member and the ambient side of the restraint. In some embodiments, as illustrated in FIGS. 5A to 6 and FIGS. 12A to 12C, the sealing member 2 may comprise a lip 16 at a distal (outer) end of the projection 14 to limit the movement of the second surface away from the restraint 5 and/or to provide a seal against the restraint when in the unpressurised condition.

Figure 5A:
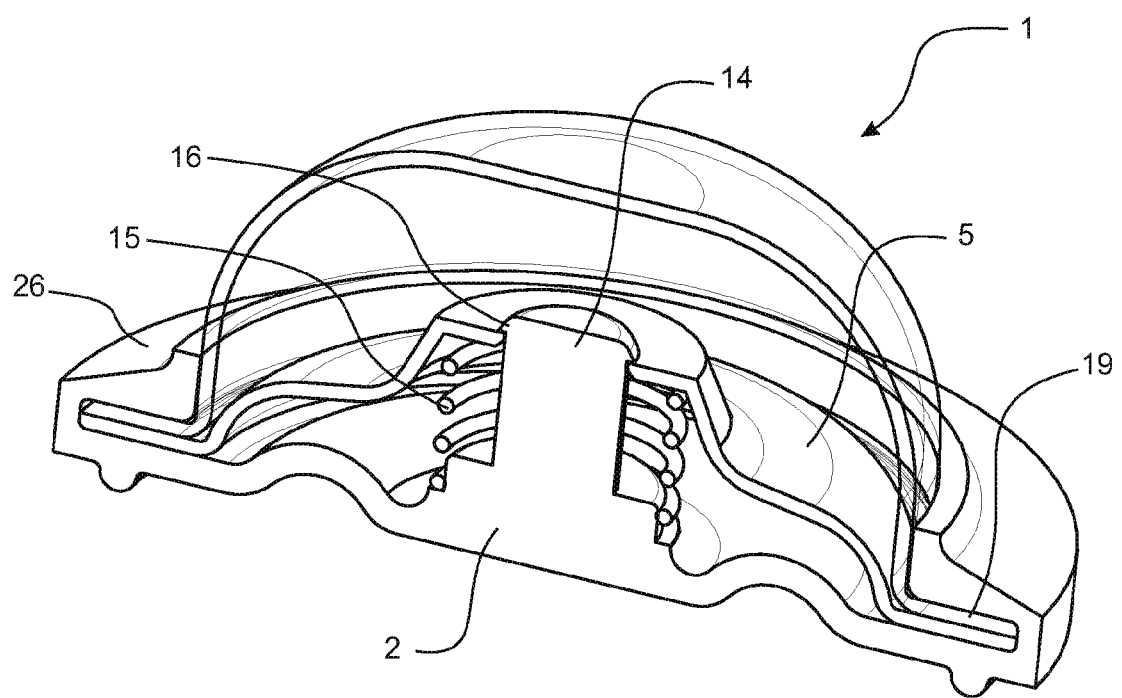
FIG. 5A is a cross sectional perspective view of another sealing device according to the present invention illustrated in an unpressurised condition.
Figure 5B:
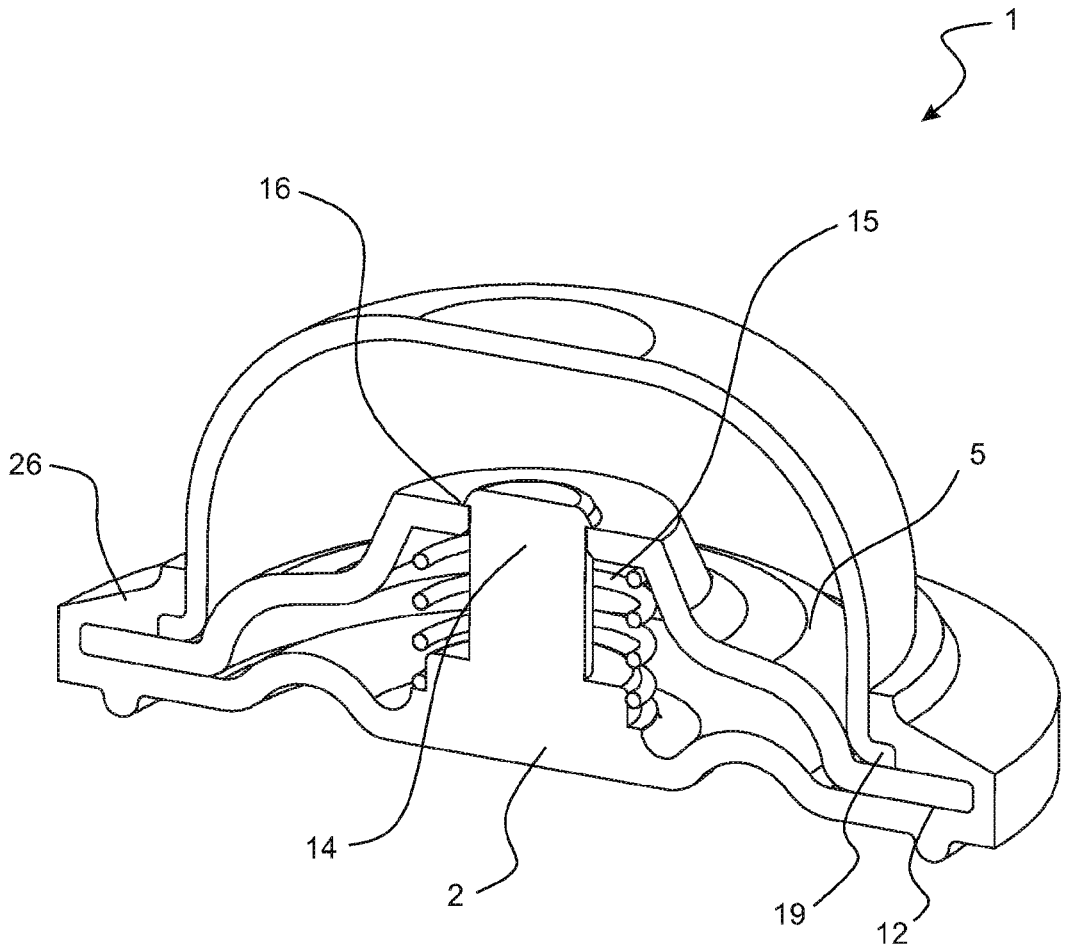
FIG. 5B is a cross sectional perspective view of another sealing device similar to the embodiment of FIG. 5A, illustrated in an unpressurised condition.
Figure 6:
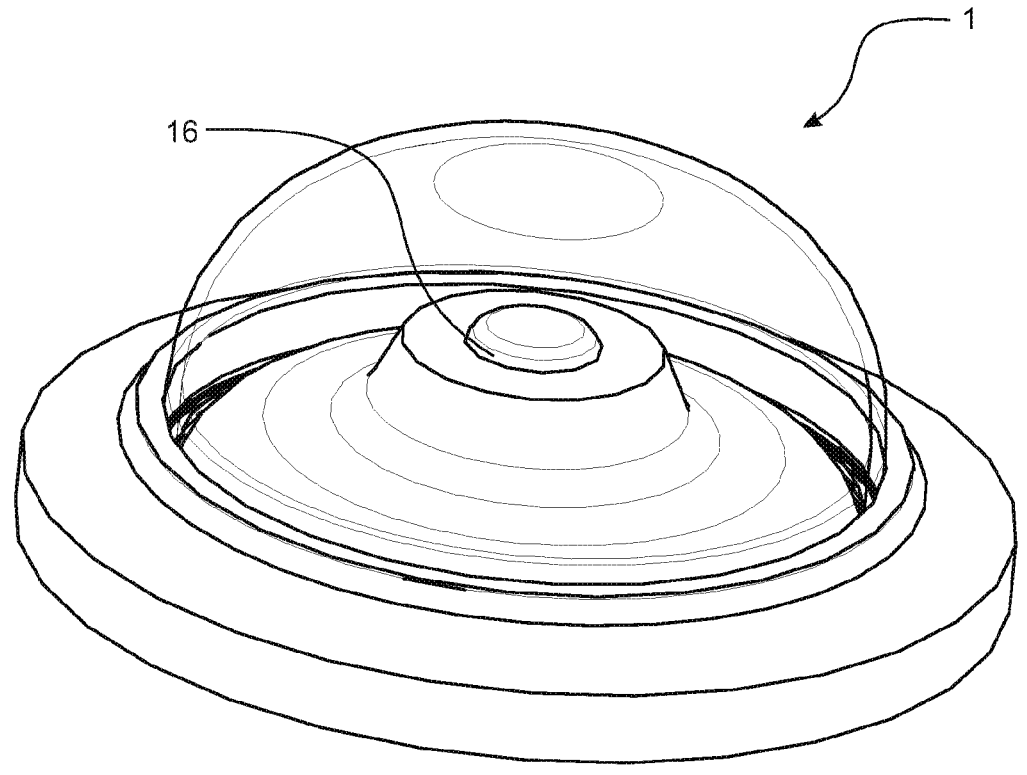
FIG. 6 is a perspective view of the sealing device of FIG. 5A or 5B with the sealing device illustrated in an unpressurised condition.

FIGS. 5A and 5B illustrate the sealing and pressure sensing device in an unpressurised condition, with the lip 16 in contact with an externally facing surface of the restraint 5. In the embodiment of FIGS. 12A to 12D, the restraint has an annular shoulder 7*b* (FIG. 12D) about the aperture 7 recessed from the external surface of the restraint. As shown in FIG. 12A, in the unpressurised condition the lip 16 may form a seal with the annular shoulder.

In some embodiments, the outer surface or end of the projection 14 may comprise a first colour, for example green, and the side of the projection 14 may comprise a second colour, for example red. When the fluid is unpressurised and the projection is in a retracted position, the side of the projection and second colour is hidden from view. When the fluid is pressurised and the projection is in an extended position projecting through the aperture 7 in the restraint 5, the side of the projection and the second colour is viewable, providing an indication the fluid is pressurised.

As described above, in some embodiments the sealing device comprises a housing 20. In the embodiment of FIGS. 1 to 4 the housing is clear or at least partially transparent so that the sealing member may be viewed externally of the housing. The housing extends outwardly away from the restraining member to define an enclosure enclosing the restraining member and the inner region of the sealing member.

Again, with reference to FIGS. 1 to 4, in some embodiments, the sealing member forms a third seal with the restraining member or the housing enclosing the restraining member. For example, a third region 17 of the second surface 4 that faces the first region 12 of the second surface 4 forms the third seal with an outer facing or ambient-condition surface 18 of the housing and/or restraining member. The restraining member or the housing, or both as illustrated in FIGS. 3A and 3B, is or are positioned between the first region and the third region of the second surface. The sealing member provides an annular slot for receiving the restraining member or housing or both. The annular slot may be provided between the first and third regions of the second surface. In other words, the housing and restraining member are sandwiched between the second and third seals provided by the sealing member. The third region of the second surface corresponds with a third region of the sealing member. The slot for receiving the restraint is formed between the first and third regions of the sealing member. The sealing member covers or jackets a perimeter portion of the restraint or a perimeter portion of the housing, or both as illustrated, to retain the housing and/or restraint to the sealing member. A perimeter portion of the housing abuts with a perimeter portion of the restraining member. The third region of the sealing member overlaps the first region of the sealing member to receive the flange 19 of the housing or the perimeter portion of the restraint or both between the first and third regions of the sealing member. The third region of the sealing member forms a flange or flanged region that extends around the perimeter of the sealing member and overlaps in a radially inward manner the perimeter portion of the restraint. By overlapping the restraint or the restraint and the housing, the sealing member provides a seal with the restraint and or housing on an ambient or external side of the device. This can make the outer surfaces of the device easier to clean or maintain in a hygienic state.

In some embodiments, the housing comprises a foot 19 at an outer perimeter thereof, the foot including a base upon which the restraining member is to be abutted and a shoulder having an outer surface upon which the third region 17 of the second surface is to be sealed thereto. The sealing member covers or jackets the housing foot to retain the sealing member and the housing together. The sealing member covers or jackets the housing foot to retain the sealing member, the restraint and the housing together.

In some embodiments, the enclosure provided by the housing has a volume 28 (the volume of the enclosure) between the restraint and the housing that is greater than a volume of the cavity 27 between the restraint 5 and the second surface of the sealing member 2 when the sealing member is in the unpressurised condition displaced from the restraining member.

In some embodiments, when the device is in the non-pressurised condition, the volume of the enclosure is at least twice the volume of the cavity. In some embodiments, the housing provides a sealed cavity or volume enclosing the sealing member. The housing therefore creates an airlock or buffer acting against movement of the inner region of the sealing member towards the support surface of the restraint. By ensuring the volume of the housing relative to the volume of the cavity between the restraint and the sealing member is sufficiently large, the effect of an airlock against movement of the sealing member can be reduced. Thus, the larger the ratio of housing volume to cavity volume, the lesser the effect of the volume of air sealed in the housing, and the quicker the sealing member can move to indicate fluid pressure. The cavity 27 and housing enclosure volume 28 are in communication, so that air/gas may transfer between the two spaces. For example, air transfers between an annular gap between the projection 14 and aperture 7 in the restraint, and/or a small hole or holes may be provided through the restraint.

In some embodiments, the volume of air entrapped by the housing sealed to the sealing member provides the biasing means to bias the inner region of the sealing member away from the restraint support surface. Air may transfer between the cavity and the housing enclosure, for example through the aperture 7 (where a seal is not formed between the aperture 7 and the projection 14).

In an embodiment where the housing provides a sealed cavity or volume enclosing the sealing member and the restraint, the housing provides for a containment volume for containing fluid in the event that the sealing member leak or fails. In such an embodiment, the housing is preferably rated to hold a pressure equal to or greater than a working pressure of the process equipment for which the device is intended. In some embodiments, the housing may not be sealed from the surrounding ambient environment. The housing may comprise a port or hole so that the inside of the housing is at ambient pressure.

In an embodiment comprising a housing, preferably the housing is formed from a material that is semi rigid or is a material that is elastic or ductile or malleable so as not to be brittle at expected operational fluid pressures and given possible environmental impacts to the housing.

The illustrated embodiments are configured and adapted for use with a Tri-clamp or Tri-Clover™ style coupling assembly, as shown in FIGS. 1 and 2, and FIGS. 12B and 12C. A clamp 200 known for use in the food industry for interconnecting two flanged components is used to retain the sealing device to the aperture 9 of a process equipment, to seal the aperture. The process equipment, for example pipe 100, comprises a flange 101 about the aperture 9. To seal the aperture 9, the sealing device 1 is positioned to cover the aperture, with the sealing surface 8 of the sealing device 1 contacting a sealing surface 102 of the flange 101. As known in the art, the flange sealing surface 102 may comprise an annular groove 103. A corresponding annular projection 25 may be provided at the sealing surface 8 of the sealing member to seat in the groove 103.

The device 1 comprises a corresponding flange 26. For example, the housing foot 19 and/or the restraint and/or the restraint covered by sealing member 2 provides the flange 26. The clamp 200 may comprise two hinged C-shaped clamping sections that cover the outer circumference of the flange 26 of the device 1 and the flange 101 of the process equipment. The clamp may comprise more than two clamping sections, for example three or more clamping sections. The clamping sections of the clamp are tightened about flanges 101, 26 to clamp the two flanges together in a known way, e.g. using a nut and threaded fastener.

In some embodiments, the outer perimeter of the housing or restrain or both covered by the sealing member provides a flange to be clamped by a clamp in use to a process component comprising a corresponding flange, the clamp clamping the flange of the sealing device and the flange of the process component together. The first region of the sealing member is compressed between the retaining member and the flange of the process equipment to seal the aperture.

In some embodiments, the first region of the sealing member is compressed between the retaining member and the flange of the process equipment to seal between the retaining member and the sealing member. The housing foot 19 is pressed against a perimeter portion of the restraint. The third region of the sealing member is compressed between the clamp and the foot of the housing or the foot of the housing and the restraint, to form a seal against the housing or housing and restraint. Contact between the housing foot and the restraint preferably also forms a seal.

In the embodiment of FIGS. 12A to 12D, the restraint 5 provides the flange 26 to be clamped by the tri clamp 200.

In some embodiments the third region of the sealing member extends between the housing foot and the perimeter portion of the restraint, to form a seal with the restraint and a seal with the housing. In such an embodiment, the foot 19 or the outer perimeter of the restraint provides the flange 26 acted on by the clamp 200 to clamp the sealing device to the process component.

A sealing device according to the present invention is particularly useful in that it can be easily installed or fitted to a common coupling such as for use in a standard Tri-clamp assembly. The sealing device of FIGS. 1 to 4 provides the seal and one half of a Tri-clamp assembly. For example, in a process plant, a standard Tri-clamp sealing gasket and a Tri-clamp cap may be removed and replaced with a sealing device according to the present invention. Thus the sealing device forms the seal and one coupling of a seal and coupling pair. A sealing device according to the present invention provides a low cost, easily installable and hygienic means for providing an indication of pressure being present in a process system or component.

In some embodiments, the support surface is of a profile such that when the first surface is not exposed to a fluid or is in a non-pressurised condition, a cavity volume is defined between at least the inner region of the second surface and the support surface, and when the first surface is exposed to a fluid or is in a pressurised condition, the cavity volume is reduced.

In some embodiments, the restraint has a surface profile to accommodate the second surface of the sealing member. In some embodiments, the support surface has a profile to accommodate at least the inner region of the second surface of the sealing member.

In some embodiments, the inner region of the second surface and the support surface of the restraint are of substantially commensurate profiles to each other. In some embodiments, in a pressurised condition, the second surface contacts the support surface. The supporting surface has a profile for receiving the sealing member in the pressurised condition.

The restraint may be formed from any suitable material known in the art, to withstand pressure that the sealing member is sealing against, and may be corrosion resistant. Exemplary materials include plastic, copper, brass, mild steel, and stainless steel. The sealing member may be formed from any suitable material known in the art that is flexible and resilient and able to withstand temperature and pressure of the fluid being retained by the member, and chemically resistant to the fluid being retained. Exemplary materials include rubbers/elastomers such as EPDM, Viton, Neoprene, Nitrile, Natural rubber and also silicones but could be composites, reinforced materials, ridged and flexible materials together (ridged pin with flexible diaphragm connected or moulded on).

Figure 7:
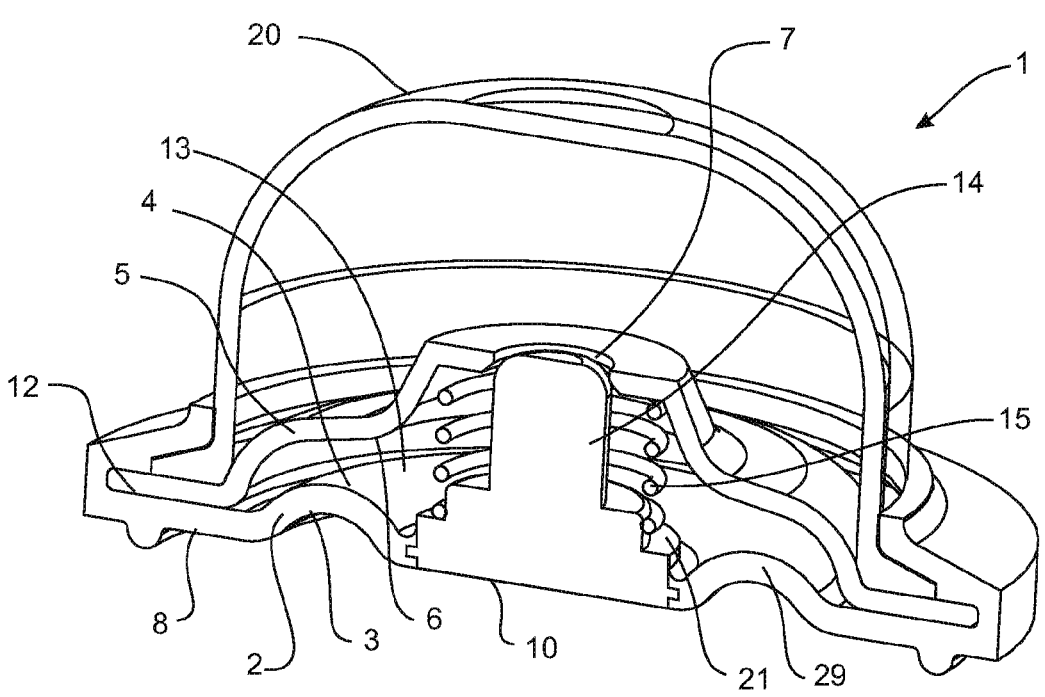
FIG. 7 is a cross sectional perspective view of another sealing device according to the present invention, illustrated in an unpressurised condition.

In the embodiments of FIGS. 1 to 6 the sealing member is a unitary component, for example an elastomeric moulded component. In some embodiments as illustrated in FIG. 7, a section of the sealing member may comprise an elastomeric material to allow the inner region of the sealing member to flex. For example, as illustrated, a projection 14 and base 21 are formed form a relatively rigid material and an elastic material section 29 is connected to the base of the projection. For example, the projection may be formed from stainless steel or engineering plastics material and the elastic portion of the sealing member may be formed from a silicone rubber.

Figure 8:
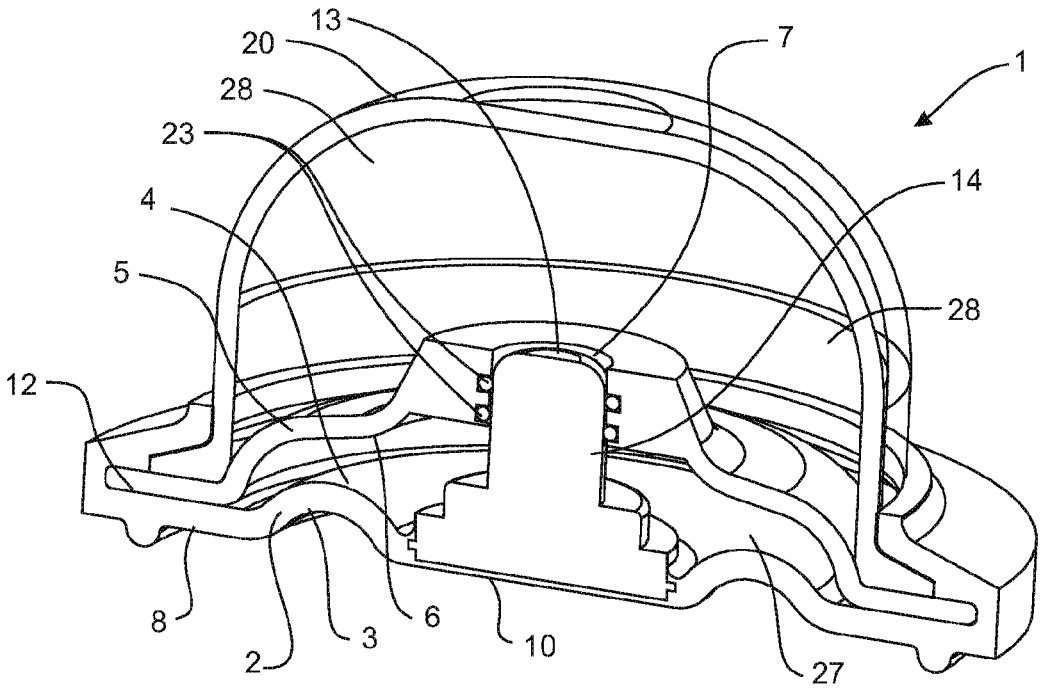
FIG. 8 is a cross sectional perspective view of another sealing device according to the present invention, illustrated in an unpressurised condition, with a dual seal formed between a projection of the sealing member and a restraining member.

The silicone rubber may be overmoulded to the projection base. In some embodiments, the elastomeric material 29 extends across the material of the projection base as shown in an alternative embodiment illustrated in FIG. 8. In FIG. 8, the elastomer 29 separates the fluid 11 in the process component from the other parts of the sealing device.

In the embodiment of FIG. 8, a seal is provided between the projection 14 and the restraint 5. For example, one or more o-rings 23 are provided in grooves in the restraint. As illustrated, a dual seal may be provided.

In FIG. 8, the volume of the cavity 27 and housing enclosure 28 are separate. In this embodiment, the device is more suited to a high-pressure fluid in the process component, as the volume of air in the cavity 27 must be compressed for the inner region of the sealing member to move towards the restraint support surface 6. The housing 20 may be omitted. The embodiment of FIG. 8 is less preferred to the embodiment of FIGS. 1-4, as a leak or failure of the sealing member inner region may cause the device to fail to indicate pressure in the fluid and also the failure of the sealing member may not be detectable.

In the embodiment of FIGS. 1 to 4 the housing must be at least semi-transparent so that the sealing member is visible. However, in the alternative embodiment of FIGS. 9A and 9B, the housing may be opaque. The projection extending from the second surface of the sealing member engages the housing when in a pressurised condition.

Figure 9A:
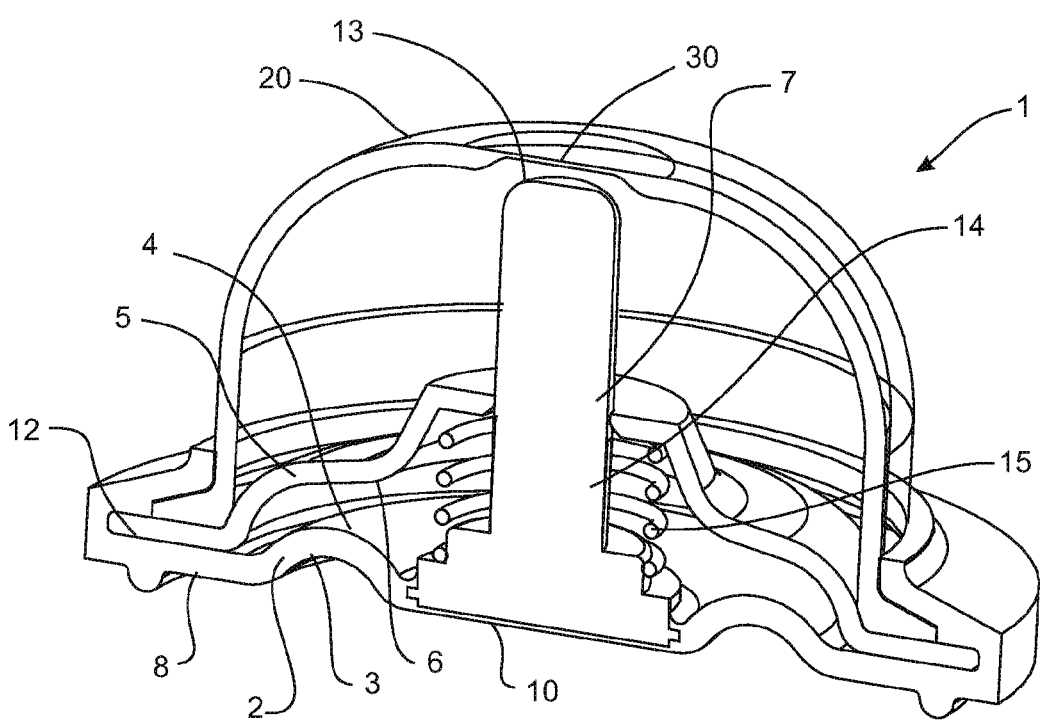
FIGS. 9A and 9B are cross sectional perspective views of another sealing device according to the present invention, FIG. 9A showing the device in an unpressurised condition, and FIG. 9B showing the device in a pressurised condition.
Figure 9B:
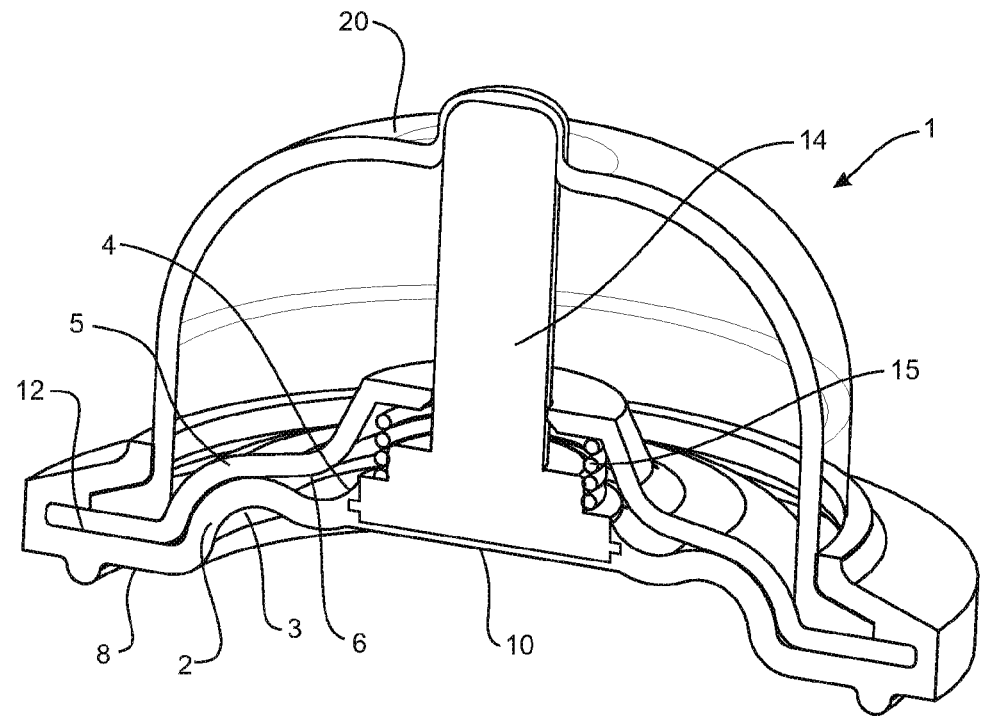

In a pressurised condition, the projection contacts the housing and deforms the housing elastically. The elastic deformation of the housing provides an indication of pressure of the process fluid 11. In some embodiments the housing has a reduced thickness portion 30. In the pressurised condition the projection deforms the thin portion 30 to indicate pressure in the process equipment, as shown in FIG. 9B. In the un-pressurised condition, the tip of the projection 14 is spaced from the housing, as illustrated in FIG. 9A.

Figure 10A:
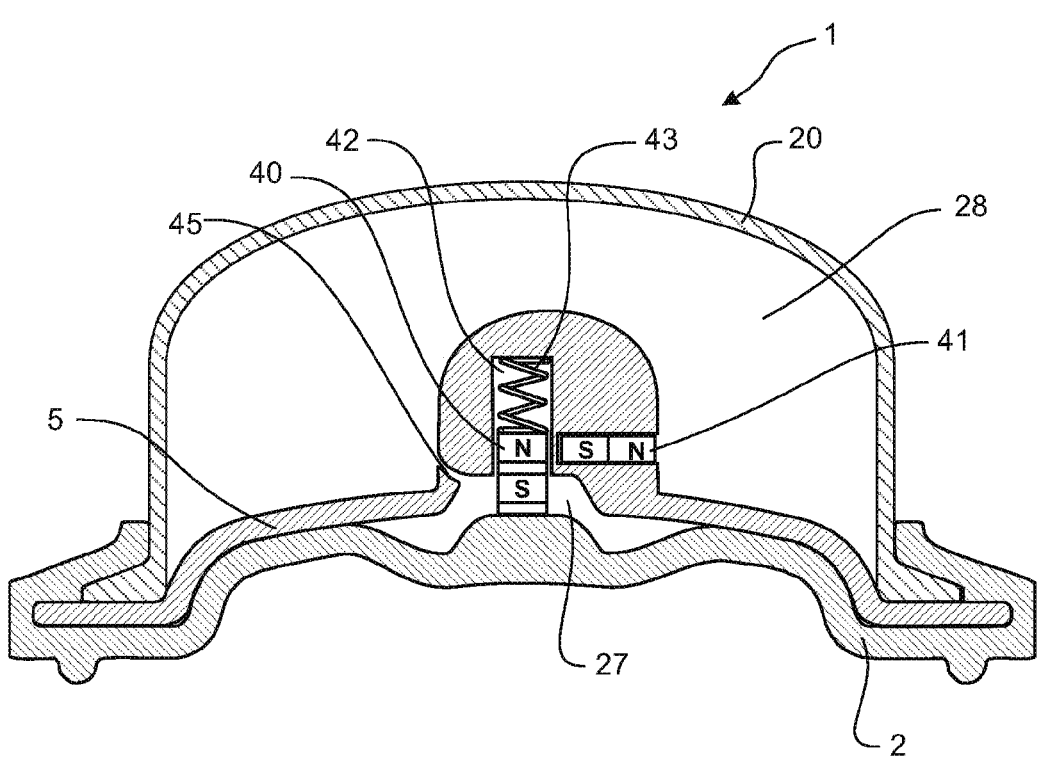
FIGS. 10A and 10B are cross sectional perspective views of another sealing device according to the present invention, FIG. 10A showing the device in an unpressurised condition, and FIG. 10B showing the device in a pressurised condition.
Figure 10B:
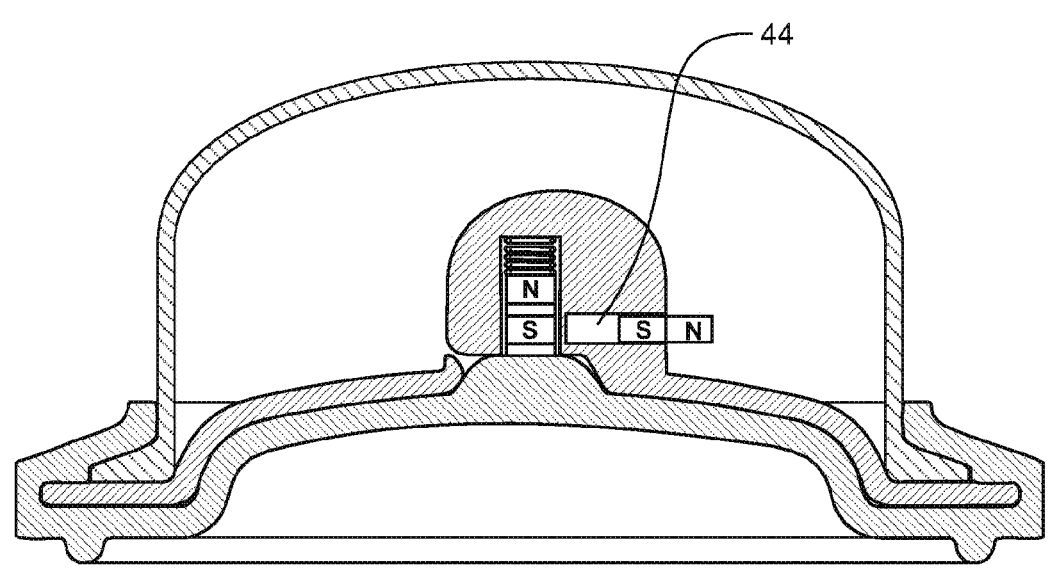

FIGS. 10A and 10B illustrate an alternative embodiment of a sealing device according to the present invention. The illustrated sealing device 1 comprises an actuator stem 40 and an indicator stem 41. The actuator stem is housed in a longitudinal recess 42 in the restraint 5. The actuator stem moves or slides within the recess 42. The actuator stem is preferably biased against or towards the inner region of the sealing member. For example, a spring 43 may be provided in the recess 42 between the actuator stem 40 and the restraint 5.

In a pressurised condition the actuator stem moves into the recess by the sealing member as the inner region of the sealing member moves into the cavity 27 between the restraint and the sealing member. The indicator stem 41 is received in a lateral recess 44 in the restraint 5. As the actuator stem moves into the recess 42 the actuator stem interacts with the indicator stem to cause the indicator stem to extend out of the lateral recess 44 of the restraint to provide an indication of pressure in the fluid 11. For example, the actuator and indicator stems may each comprise a permanent magnet. The polarities of the actuator stem and indicator stem magnets are arranged so that the indicator stem is attracted to the actuator stem when the actuator stem extends out of the longitudinal recess when the sealing member is in an un-pressurised condition, so that the indicator stem is moved into the lateral recess 44, as shown in FIG. 10A.

In a pressurised condition, with the actuator stem moved into the longitudinal recess 42, the polarities of the actuator and indicator stem magnets cause the actuator stem to repeal the indicator stem to cause the indicator stem to extend out of the lateral recess, as shown in FIG. 10B. In an alternative embodiment, the actuator and indicator stems may comprise complementary cam surfaces, mechanical contact between the actuating stem and the indicator stem driving the indicator stem to the extended position for indicating fluid pressure sensed by the sealing member.

The embodiment of FIGS. 10A and 10B may be particularly useful for sensitive sensing of a pressure condition. The effect of the change in volume of the cavity 27 has less effect on the movement of the sealing member, as the volume of the cavity 27 may be made small compared to the volume of the housing enclosure 28. The spring or biasing means 43 predominantly controls the sensitivity of the pressure sensing provided by the sealing device 1. The cavity and enclosure are preferably in communication, for example via a hole 45.

Figure 11A:
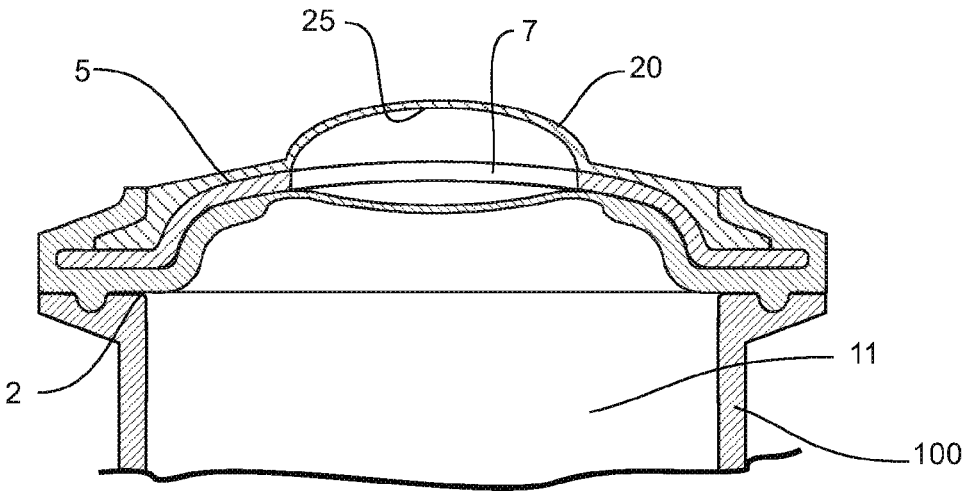
FIGS. 11A and 11B are cross sectional perspective views of another sealing device according to the present invention, the sealing device positioned on a process component for sealing an aperture of the process component.
Figure 11B:
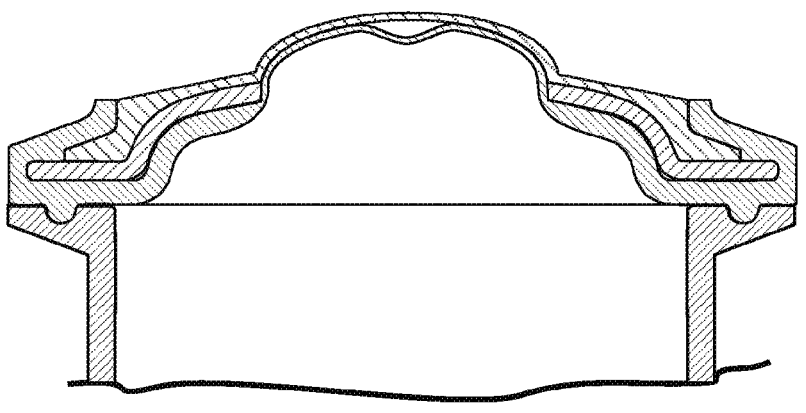

FIGS. 11A and 11B illustrate an alternative embodiment of a sealing device according to the present invention.

In the embodiment of FIGS. 11A and 11B, the sealing member 2 comprises a reduced thickness diaphragm section 24 aligned with the aperture 7 in the restraint 5. The diaphragm is an inner region of the sealing member. Where the fluid in the process component is unpressurised, the diaphragm section is spaced from the aperture of the restraint, as illustrated in FIG. 11A. Where the fluid 11 is pressurised, the diaphragm is expanded to extend through the aperture 7 to provide an indication that there is pressure contained in the process equipment.

In some embodiments, the housing 20 is shaped to provide a support surface 25 for the diaphragm in an extended or pressurised condition, as illustrated. The diaphragm expanded through the aperture 7 and in contact with the support surface of the housing indicates there is pressure in the process equipment. Air trapped between the housing and the sealing member diaphragm holds a portion of the diaphragm off the housing when in the pressurised condition, as shown in FIG. 11B. In this embodiment, the housing acts as a restraint for limiting the amount of movement of the sealing member due to pressure in the process equipment.

FIGS. 13A to 13D illustrate alternative embodiments of a sealing device according to the present invention. Each of the embodiments of FIGS. 13A to 13D comprise a housing 20. The housing 20 is clear or at least partially transparent so that the sealing member may be viewed externally of the housing. The housing extends outwardly away from the restraining member to define an enclosure to receive the indicator projection 14 of the sealing member 2 at least when the sealing member 2 is in the pressurised condition.

In some embodiments the housing may be fitted to the aperture of the restraint.

In some embodiments, the housing 20 may be attached to the restraint 5 by a threaded connection 33.

Figure 13A:
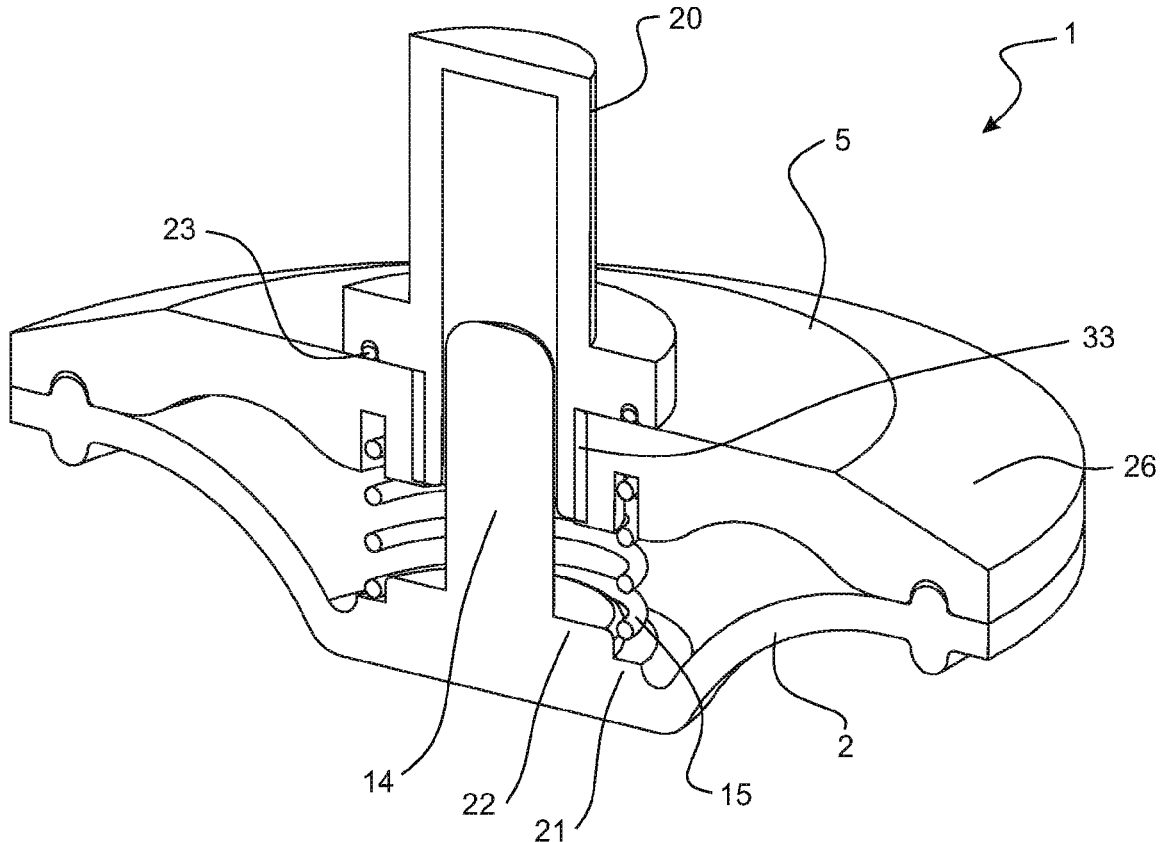
FIGS. 13A to 13C are cross sectional perspective views of further sealing devices according to the present invention.

In FIG. 13A, the housing comprises a male thread received in a female thread within the aperture 7 of the restraint, the housing screwed into the aperture 7 from an outer side of the restraint 5.

Figure 13B:
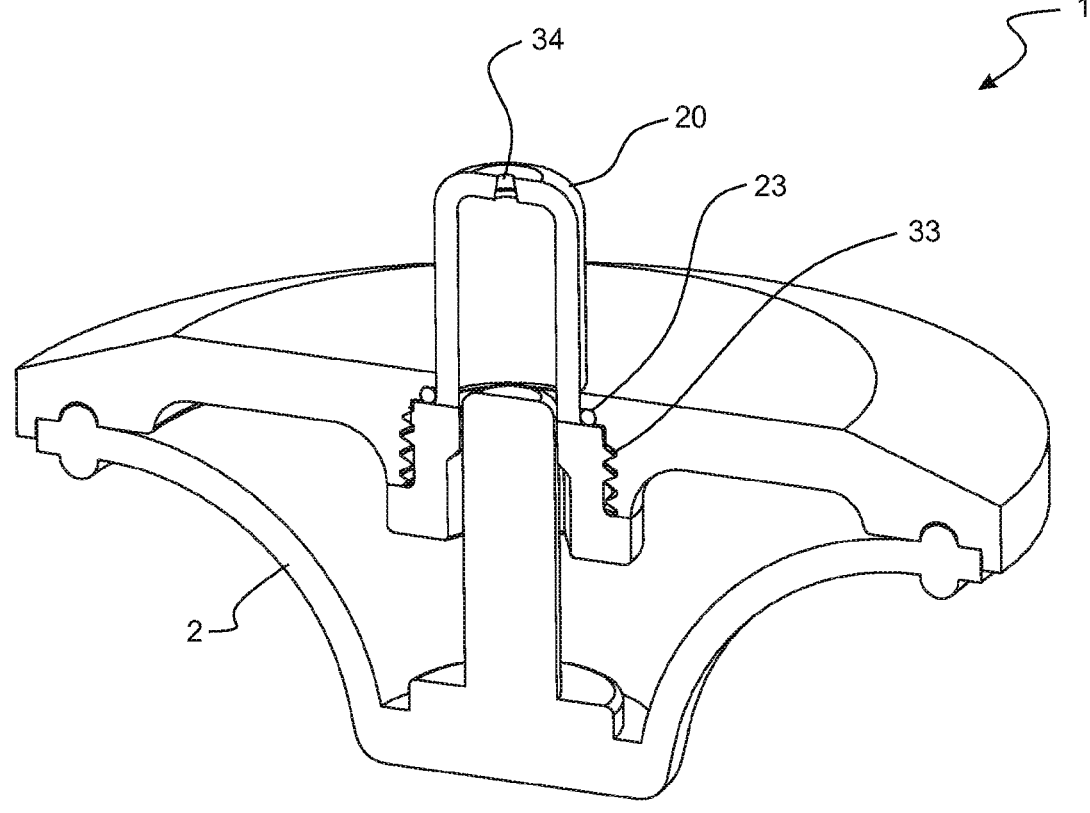

In FIG. 13B, the housing 20 is assembled to the restraint through the aperture 7 from an inside of the restraint and retained in place by a nut screwed into the threaded aperture 7 from an inside of the restraint.

Figure 13C:
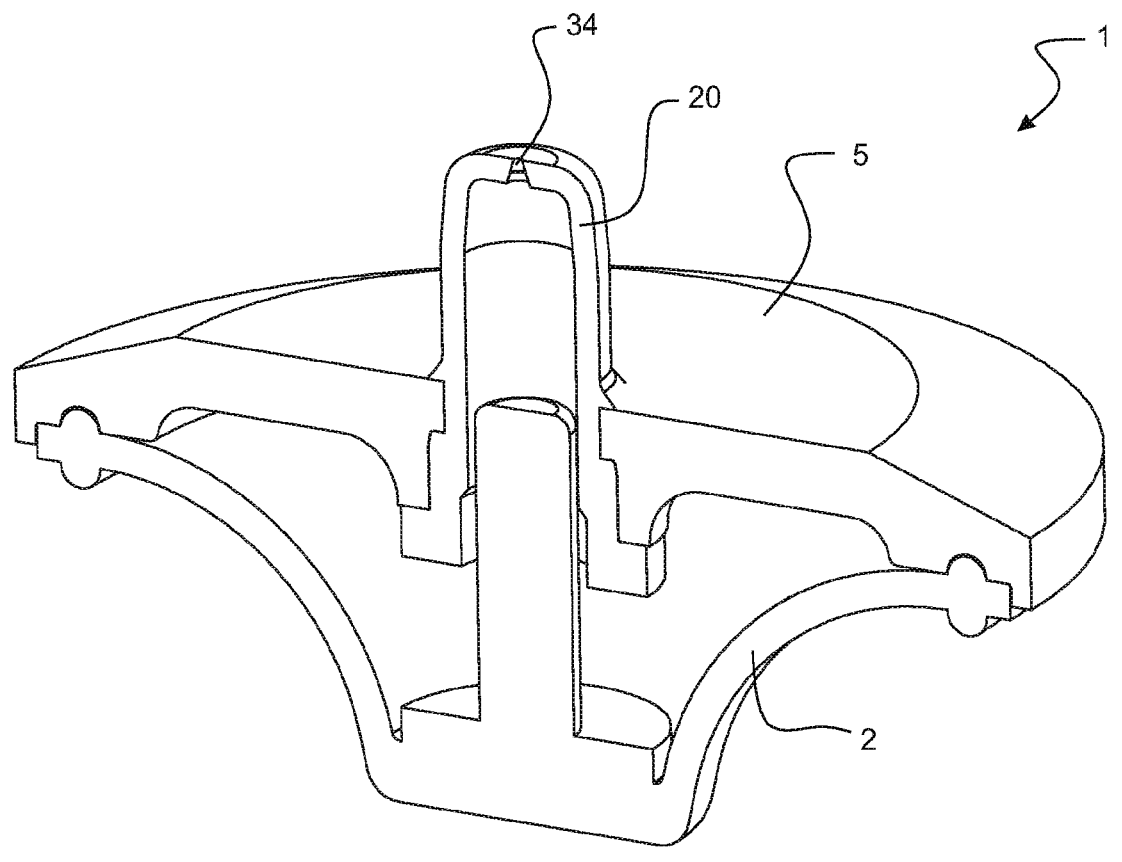
Figure 13D:
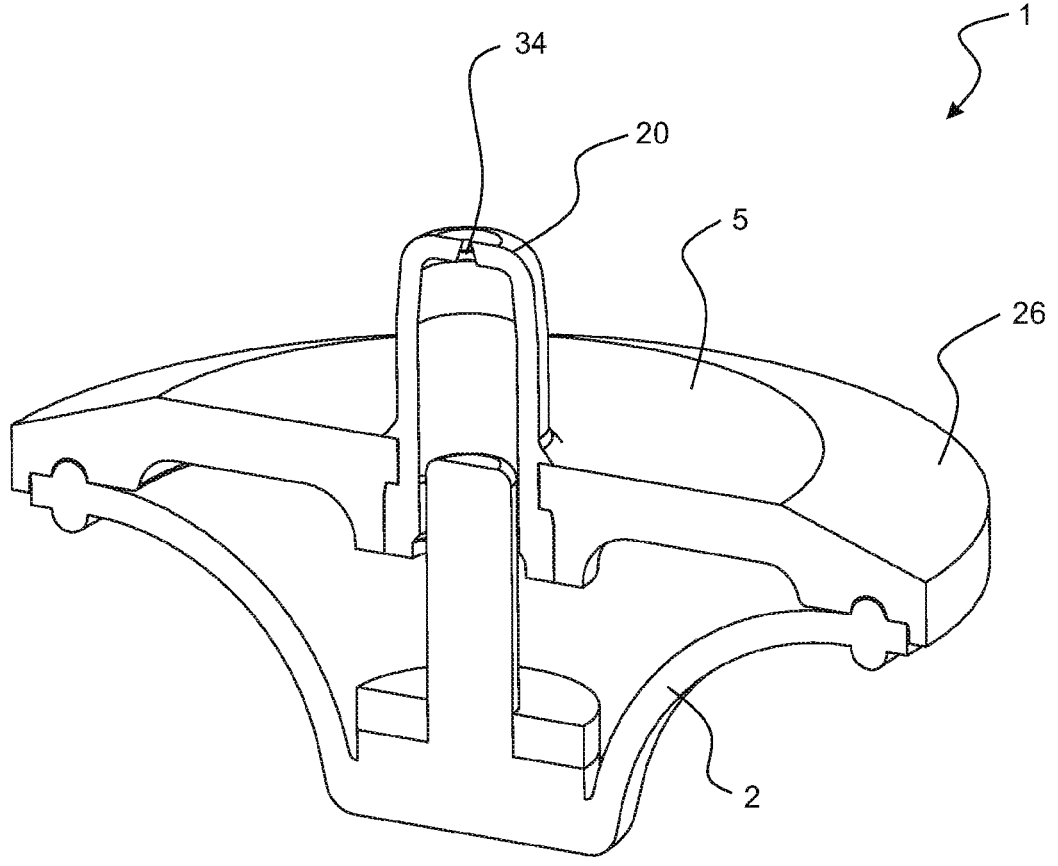

An o-ring 23 may be provided between the housing 20 and the restraint. In FIG. 13B, a hole or port 34 is provided so that the inside of the housing is open to ambient pressure, whereas in FIG. 13A the housing is sealed as described earlier with reference to the embodiment of FIGS. 1 to 4. The embodiment of FIG. 13A is more suited for use with a higher process pressure than the embodiment of FIG. 13B. In FIGS. 13C and 13D the housing 20 may be press fit to the restraint from an inside of the restraint.

The housing 20 may be of a flexible/resilient material to allow the housing to be pressed into the aperture of the restraint and may have a flange on one or both sides to secure the housing axially to the restraint.

Figure 14A:
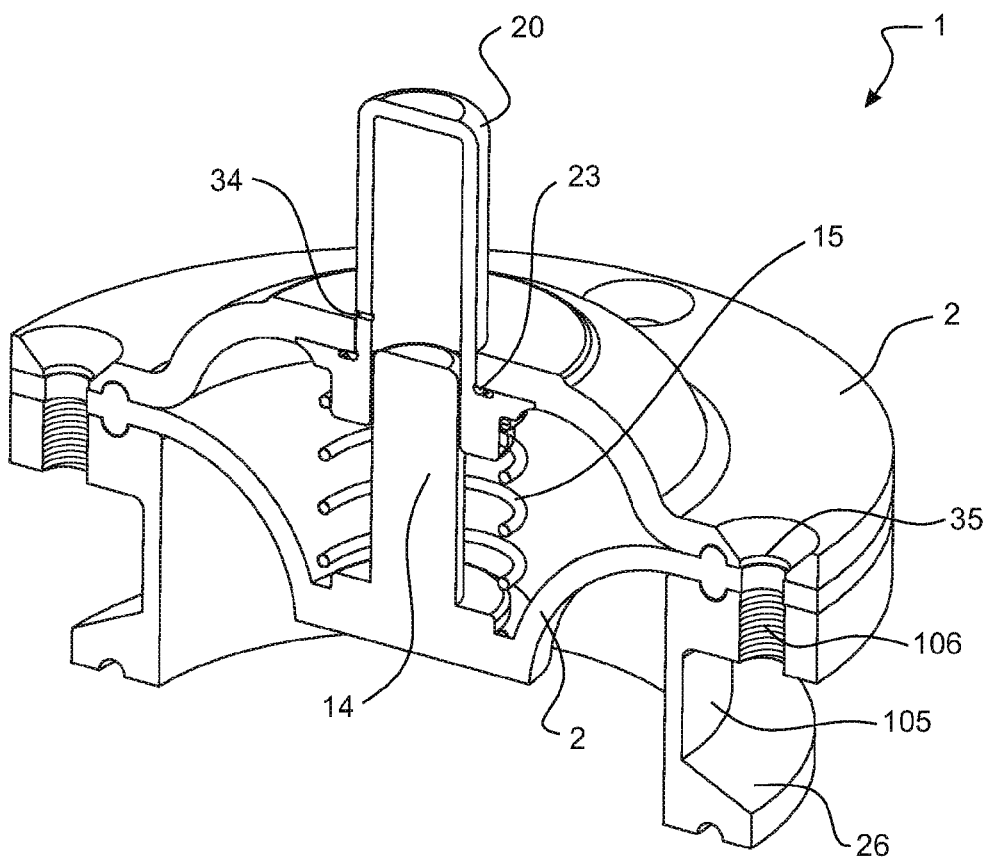
FIGS. 14A and 14B are cross sectional perspective views of further sealing devices according to the present invention.
Figure 14B:
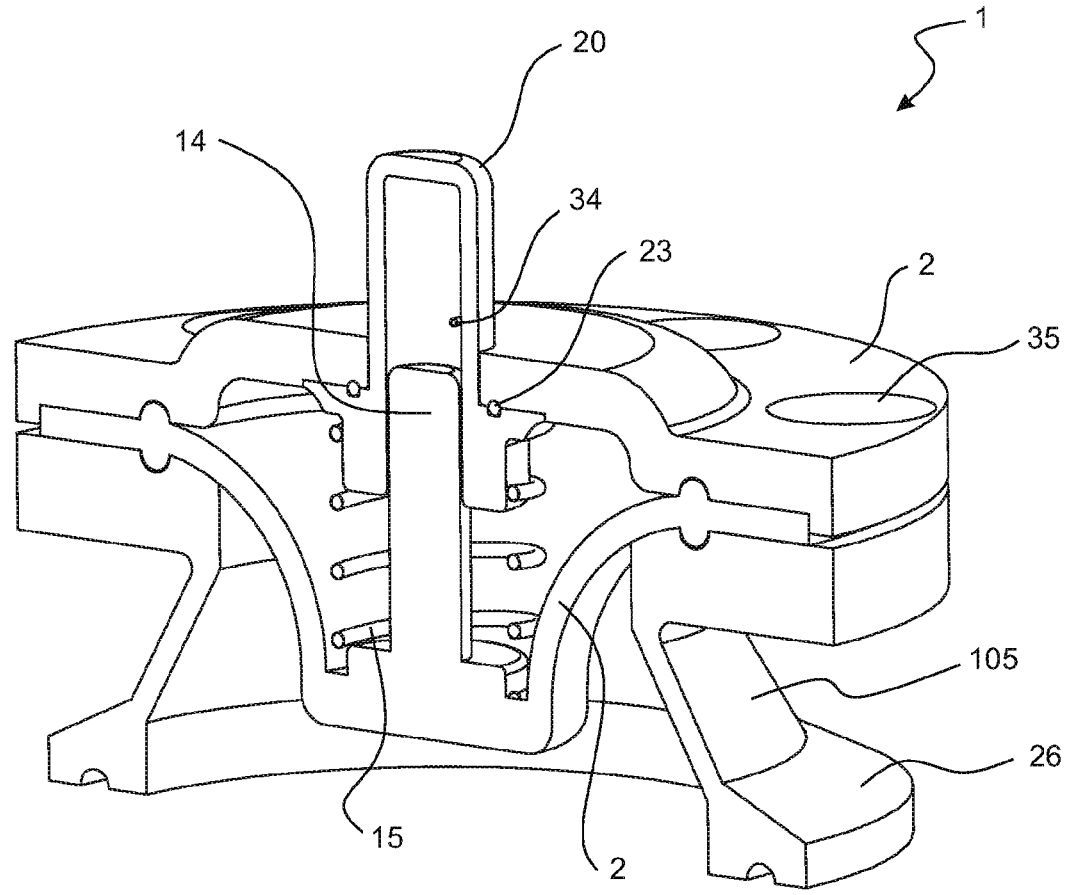

FIGS. 14A and 14B illustrate two further embodiments. In each of the embodiments of FIGS. 14A and 14B the device 1 comprises a sealing member and a restraining member, and a process component or connector 105. The sealing member is held between and sandwiched by the restraining member 2 and the process component. In each embodiment the restraining member, process connector 105 and sealing member 2 are held together by fasteners (omitted from the figures) extending through holes 35 in the restraining member, sealing member and process connector. One of the process connector and the restraining member may comprise threaded holes 106 for receiving a male thread of a fastener. The process component 105 is adapted to interface with another process component to fit over an aperture of the other process component, for example a pipe 100 like that shown in FIG. 1, so that the sealing member is provided over the aperture of the pipe 100 to be exposed to fluid within the pipe 100 via the process connector 105.

A sealing device according to the present invention provides an indication that a fluid exposed to a sealing or pressure side the device is at a pressure elevated above ambient pressure.

Further, a device according to the present invention is a purely mechanical device, providing an indication of fluid pressure without the requirement for electrical components or electrical power or an electrical output that requires an electronic user display interface.

A device according to the present invention thus presents a low-cost solution to existing electrical pressure transducer solutions. A device according to the present invention may also present a lower cost solution to other purely mechanical pressure indicators such as a pressure gauge comprising a needle and spring arrangement, since a sealing device according to the present invention has fewer components.

A further benefit of the present invention is that the device is easy to clean, and due to its low cost, provides for a direct replacement solution as a consumable item as an alternative to cleaning, which is particularly desirable for food processing facilities such as in dairy processing facilities.

A sealing device according to the present invention is thus particular beneficial for use in the food industry, however may find use in other industries such as oil and gas/petrochemical, automotive industries, controlled air pressure environments (e.g. in laboratories), or other industries that require a pressure indication for example on actuators and pressure relief valves. Previously described examples relate to the indication of a positive pressure or when a pressure is above a threshold pressure. However, a sealing device according to the present invention may be useful to indicate when a pressure drops below ambient or a threshold pressure. For example, in a positive pressure laboratory environment a sealing device according to the present invention may be mounted to an aperture through a wall of the laboratory. When the laboratory is at the required positive pressure the indicator projection and sealing member is in the retracted position. When the pressure in the laboratory environment drops below a required pressure the indicator projection and sealing member is deflected to the extended position providing an indication to laboratory personnel that pressure in the laboratory has been lost.

A sealing device according to the present invention may also be used to indicate a vacuum in a vacuum chamber.

A further example of use for a sealing device according to the present invention is to indicate a vehicle tyre pressure is above a required threshold. When a tyre pressure is above a threshold the sealing member projection is extended indicating no intervention is required, and when the tyre pressure is below a threshold the sealing member projection is retracted indicating that air must be added to the tyre to increase the pressure to achieve the required threshold.

The foregoing description of the invention includes preferred forms thereof. Modifications may be made thereto without departing from the scope of the invention.

The invention claimed is:

1. A fluid sealing device comprising:
a sealing member comprising a first surface and a second surface opposite the first surface,
a first region of the first surface for forming a first seal about a process component aperture of a process component containing a fluid, and an inner region of the first surface to be exposed to the fluid via the process component aperture,
a restraining member providing a support surface facing the second surface to limit an amount of movement of the sealing member in a pressurized condition by contact, and a perimeter portion of the restraining member adapted to seal with a first region of the second surface, the first regions of the first surface and the second surface corresponding with a first region of the sealing member, and
wherein the restraining member comprises an aperture through the support surface, and the sealing member further comprising a projection aligned with the aperture in the support surface and configured to extend through the aperture, an inner region of the second surface spaced from the support surface to form a cavity between the inner region of the second surface and the support surface at least in an unpressurised condition, wherein the inner regions of the first surface and the second surface correspond with an inner region of the sealing member, the inner region of the sealing member moveable towards and away from the support surface under action of a pressure of the fluid on the inner region of the first surface to provide an indication of the pressure, by moving the projection in the aperture.

2. The fluid sealing device of claim 1, wherein the first region of the second surface of the sealing member forms a second seal with the perimeter portion of the restraining member.

3. The fluid sealing device of claim 1, wherein an outer perimeter of the restraining member provides a flange to be clamped by a clamp in use to the process component comprising a corresponding flange about the process component aperture, the clamp clamping the flange of the sealing device and the flange of the process component together.

4. The fluid sealing device of claim 1, wherein the sealing member forms a seal with the perimeter portion of the restraining member.

5. The fluid sealing device of claim 1, wherein the restraining member enables optical or visual detection of an extent to which the projection is moved by the pressure.

6. The fluid sealing device of claim 1, wherein at least one of:
  the projection is a single projection;
  the projection is centrally located on the second surface; or
  the projection or at least one side of the projection is of a visually contrasting colour compared to the restraining member.

7. The fluid sealing device of claim 1, wherein the sealing member comprises:
  an annular rib located at a base of the projection, in a pressurised condition the annular rib adapted to locate into the aperture to seal an annular space between the aperture and the projection.

8. The fluid sealing device of claim 1, wherein the inner region of the sealing member comprises a curved annular portion between a central portion and a perimeter portion, so that the second surface of the sealing member is convex between the central portion and the perimeter portion.

9. The fluid sealing device of claim 1, wherein an annular gap or space is provided between the projection and the aperture with the projection extending through the aperture.

10. The fluid sealing device of claim 1, wherein the restraining member has a surface profile to accommodate the second surface of the sealing member.

11. The fluid sealing device of claim 1, wherein the support surface has a profile to accommodate at least the inner region of the second surface of the sealing member.

12. The fluid sealing device of claim 1, wherein an extent to which the projection extends into and/or through the aperture in the support surface is indicative of the fluid pressure.

13. The fluid sealing device of claim 12, wherein the projection provides for a visual indicator of the presence of a fluid at an elevated pressure condition.

14. The fluid sealing device of claim 1, wherein the projection is a raised surface profile extending from the second surface.

15. The fluid sealing device of claim 14, wherein the projection extends from the second surface of a height so as to project through the aperture when in a pressurised condition.

16. The fluid sealing device of claim 1, wherein the sealing member has a stop at a base of the projection, the stop providing a surface to contact the support surface when the sealing device is in a pressurised condition.

17. The fluid sealing device of claim 16, wherein:
  the stop is dimensioned so as to be unable to extend into or through the aperture; or
  the support surface is profiled so as to receive or accommodate the stop.

18. The fluid sealing device of claim 1, wherein the sealing member has a lip at a distal end of the projection to limit movement of the second surface away from the restraining member and/or to provide a seal against the restraining member when in an unpressurised condition.

19. The fluid sealing device of claim 18, wherein the restraining member has an annular shoulder about the aperture recessed from an external surface of the restraining member, and in the unpressurised condition the lip forming a seal with the annular shoulder.

20. The fluid sealing device of claim 1, wherein the sealing member is or comprises an elastomeric material or member.

21. The fluid sealing device of claim 20, wherein the sealing member is a unitary member.

22. The fluid sealing device of claim 1, wherein the support surface is of a profile such that when the first surface is not exposed to a fluid or is in a non-pressurised condition, a cavity volume is defined between at least the inner region of the second surface and the support surface, and when the first surface is exposed to a fluid or is in a pressurised condition, the cavity volume is reduced.

23. The fluid sealing device of claim 22, wherein the cavity volume varies according to the relative position of the second surface to the support surface.

24. The fluid sealing device of claim 1, wherein at least one of:
  the sealing member is elastically deformable; or
  the sealing member is elastically deformed and the inner region of the sealing member is moveable by elastic deformation upon influence of the fluid upon the inner region of the first surface.

25. The fluid sealing device of claim 24, wherein the inner region of the sealing member is substantially resiliently flexible.

26. The fluid sealing device of claim 1, wherein the inner region of the sealing member comprises a resilient section extending between the first region and the projection, and the projection comprises a relatively rigid material.

27. The fluid sealing device of claim 26, wherein a material of the resilient section covers a base of the projection to form a continuous surface forming the first surface of the sealing member.

28. The fluid sealing device of claim 27, wherein the resilient section comprises an elastomeric material.

29. The fluid sealing device of claim 26, further comprising a seal between the projection received in the aperture and the restraining member.

* * * * *